United States Patent
Nomura et al.

(10) Patent No.: US 7,527,438 B2
(45) Date of Patent: May 5, 2009

(54) RETRACTABLE PHOTOGRAPHIC LENS

(75) Inventors: Hiroshi Nomura, Saitama (JP); Shinya Suzuka, Saitama (JP); Ken Endo, Saitama (JP)

(73) Assignee: Hoya Corporation, Tokyo (JP)

( * ) Notice: Subject to any disclaimer, the term of this patent is extended or adjusted under 35 U.S.C. 154(b) by 279 days.

(21) Appl. No.: 11/668,194

(22) Filed: Jan. 29, 2007

(65) Prior Publication Data

US 2007/0177865 A1 Aug. 2, 2007

(30) Foreign Application Priority Data

Jan. 31, 2006 (JP) ............................. 2006-023214

(51) Int. Cl.
*G03B 5/02* (2006.01)
*G03B 17/00* (2006.01)
(52) U.S. Cl. ........................................ 396/349; 396/73
(58) Field of Classification Search .................. 396/73, 396/75, 348–350; 359/817, 819
See application file for complete search history.

(56) References Cited

U.S. PATENT DOCUMENTS

| | | | |
|---|---|---|---|
| 6,853,500 B2 | 2/2005 | Nomura et al. | |
| 6,978,089 B2 | 12/2005 | Nomura et al. | |
| 7,013,081 B2 | 3/2006 | Nomura et al. | |
| 7,079,761 B2 | 7/2006 | Nomura | |
| 7,097,367 B2 | 8/2006 | Nomura | |
| 2005/0207748 A1* | 9/2005 | Ishizuka et al. | 396/349 |
| 2006/0034604 A1 | 2/2006 | Nomura et al. | |
| 2006/0115262 A1 | 6/2006 | Nomura | |
| 2006/0193625 A1 | 8/2006 | Nomura | |
| 2006/0274430 A1 | 12/2006 | Nomura et al. | |

* cited by examiner

*Primary Examiner*—Melissa Jan Koval
*Assistant Examiner*—Minh Phan
(74) *Attorney, Agent, or Firm*—Greenblum & Bernstein, P.L.C.

(57) ABSTRACT

A retractable photographic lens includes a moving ring; a holding frame which holds a retractable optical element and is movable between a photographing position and a displaced position displaced from the photographing position; and a driving device which moves the holding frame from the photographing position to the displaced position using a rearward moving force of the moving ring when the retractable photographic lens moves from a operating state to a fully-retracted state. The driving device includes first and second driving devices which give the holding frame first and second amounts of retractive movement per unit of movement of the moving ring, respectively. When the retractable photographic lens moves from the operating state to the fully-retracted state, the first driving device firstly moves the holding frame toward the displaced position and subsequently the second driving device moves the holding frame to the displaced position.

17 Claims, 16 Drawing Sheets

RETRACTABLE PHOTOGRAPHIC LENS

BACKGROUND OF THE INVENTION

1. Field of the Invention

The present invention relates a retractable photographic lens which can retract to make the length thereof shorter than that in a ready-to-photograph state when no photographic operation is carried out.

2. Description of the Related Art

Miniaturization of cameras is ever continuous, and therefore, miniaturization of retractable photographic lenses for cameras, which retract to reduce the length thereof in a non-operating state, has been in increasing demand. As a solution to meet this demand, the assignee of the present invention has proposed a retractable lens which is disclosed in U.S. Pat. No. 6,978,089 (U.S. patent application Ser. No. 10/368,342). This retractable lens is characterized in that a plurality of optical elements of a photographing optical system are aligned with an optical axis in a ready-to-photograph state, and that a part of the plurality of optical elements is radially-retracted to a position (radially-retracted position) deviating from the optical axis of the remaining optical elements while being retracted, together with remaining optical elements on the optical axis thereof, in the direction of the optical axis of the photographing optical system when the photographic lens is fully retracted.

The retractable optical element disclosed in U.S. Pat. No. 6,978,089 not only moves forward and rearward along a photographing optical axis in a similar manner as to a movable optical element of a conventional zoom lens, but also moves radially about a pivot parallel to the photographing optical axis. Therefore, the retractable optical element is required to move with a high degree of accuracy. In this case, it is a matter of course to position the retractable optical element precisely on the photographing optical axis, and it is desirable to control the position of the retractable optical element also in a state where the retractable optical element is retracted from the photographing optical axis. For instance, if the radially-retracted position of the retractable optical element is controlled with a high degree of precision, it is not necessary to provide an excessive clearance for the movement of the retractable optical element in anticipation of positional errors occurring when the retractable optical element is moved to the radially-retracted position, which makes it possible to further miniaturize the photographic lens.

SUMMARY OF THE INVENTION

The present invention provides a retractable photographic lens including the aforementioned retractable optical element, which is retracted to a displaced position (off-axis position) deviating from the photographing optical axis while being retracted along the photographing optical axis when the photographic lens is fully retracted, wherein the retractable optical element can be moved to the displaced position with a high degree of precision.

According to an aspect of the present invention, a retractable photographic lens is provided, including an optical-axis-direction moving ring which moves rearward along an optical axis of a photographing optical system when the retractable photographic lens moves from an operating state to a fully-retracted state; a retractable-optical-element holding frame which holds a retractable optical element (LG2) of the photographing optical system and is positioned inside the optical-axis-direction moving ring and supported thereby to be movable between a photographing position at which the retractable optical element is aligned with the optical axis and a displaced position at which the retractable optical element is displaced from the photographing position; and a lens-element-retracting driving device which moves the retractable-optical-element holding frame from the photographing position to the displaced position using a rearward moving force of the optical-axis-direction moving ring when the retractable photographic lens moves from the operating state to the fully-retracted state. The lens-element-retracting driving device includes a first lens-element-retracting driving device which gives the retractable-optical-element holding frame a first amount of retractive movement per unit of movement of the optical-axis-direction moving ring, and a second lens-element-retracting driving device which gives the retractable-optical-element holding frame a second amount of retractive movement per unit of movement of the optical-axis-direction moving ring, the second amount of retractive movement being smaller than the first amount of retractive movement. When the retractable photographic lens moves from the operating state to the fully-retracted state, the first lens-element-retracting driving device firstly moves the retractable-optical-element holding frame toward the displaced position and subsequently the second lens-element-retracting driving device moves the retractable-optical-element holding frame to the displaced position.

It is desirable for the retractable photographic lens to include a rear-mounted member positioned behind the optical-axis-direction moving ring and the retractable-optical-element holding frame, a distance between the rear-mounted member and the optical-axis-direction moving ring in the optical axis direction becoming smaller as the retractable photographic lens moves from the operating state to the fully-retracted state. The first lens-element-retracting driving device and the second lens-element-retracting driving device include a first rear-mounted engaging portion and a second rear-mounted engaging portion, respectively, which are provided on the rear-mounted member at different positions both in a direction parallel to the optical axis and in a direction orthogonal to the optical axis; and a first engaging portion and a second engaging portion, respectively, which are provided on the retractable-optical-element holding frame and come into contact with the first rear-mounted engaging portion and the second rear-mounted engaging portion, respectively, with a time difference therebetween when the optical-axis-direction moving ring moves rearward.

It is desirable for the first rear-mounted engaging portion and the second rear-mounted engaging portion to be formed on a projection which projects forward from the rear-mounted member in the optical axis direction.

It is desirable for each of the first rear-mounted engaging portion and the second rear-mounted engaging portion to include a lens-retracting/guiding surface which is inclined to the optical axis, and gives the retractable-optical-element holding frame a moving force which moves the retractable-optical-element holding frame in a direction from the photographing position to the displaced position in accordance with a rearward movement of the optical-axis-direction moving ring; and a holding surface which is formed behind the lens-retracting/guiding surface in the optical axis direction to be continuous with the lens-retracting/guiding surface, the holding surface extending parallel to the optical axis, and preventing the retractable-optical-element holding frame from moving toward the photographing position from the displaced position via engagement with the retractable-optical-element holding frame.

It is desirable for an angle of the lens-retracting/guiding surface of the first rear-mounted engaging portion relative to the optical axis to be greater than an angle of the lens-retracting/guiding surface of the second rear-mounted engaging portion relative to the optical axis.

It is desirable for the rear-mounted member to be immovable in the optical axis direction.

It is desirable for the retractable-optical-element holding frame to be pivoted about a pivot on the optical-axis-direction moving ring to be swingable between the photographing position and the displaced position.

It is desirable for the pivot to extend substantially parallel to the optical axis.

It is desirable for a radial distance from the first lens-element-retracting driving device to the pivot of the retractable-optical-element holding frame to be different from a radial distance from the second lens-element-retracting driving device to the pivot of the retractable-optical-element holding frame.

It is desirable for the first lens-element-retracting driving device and the second lens-element-retracting driving device to include a first lens-retracting/guiding surface and a second lens-retracting/guiding surface which are inclined to the optical axis by mutually different angles, wherein the radial distance from the pivot to the first lens-retracting/guiding surface and the radial distance from the pivot to and second lens-retracting/guiding surface are mutually identical.

It is desirable for the retractable-optical-element holding frame to includes a cylindrical lens holder portion configured to hold the retractable optical element; a swing arm portion projecting from the cylindrical lens holder portion in a radial direction of the cylindrical lens holder portion; and a pivoted cylindrical portion located at an end of the swing arm portion and fitted on a pivot which extends substantially parallel to the optical axis and which is positioned inside the retractable-optical-element holding frame. The swing arm portion includes a first retracted state holding surface and a second retracted state holding surface which are located in that order from the pivoted cylindrical portion side, and are engaged with the holding surface of the first rear-mounted engaging portion and the holding surface of the second rear-mounted engaging portion, respectively, to hold the retractable-optical-element holding frame in the displaced position when the retractable photographic lens moves from the operating state to the fully-retracted state.

It is desirable for the retractable-optical-element holding frame to be positioned inside the optical-axis-direction moving ring and supported thereby to be movable in a straight radial direction between the photographing position and the displaced position.

It is desirable for the retractable-optical-element holding frame to be movable in a plane substantially orthogonal to the optical axis between the photographing position and the displaced position relative to the optical-axis-direction moving ring.

It is desirable for the retractable-optical-element holding frame to be biased toward the photographing position by a spring, the first and second lens-element-retracting driving devices moving the retractable-optical-element holding frame from the photographing position to the displaced position against a biasing force of the spring.

It is desirable for the optical-axis-direction moving ring to be guided linearly along the optical axis without rotating relative to the rear-mounted member.

It is desirable for the photographing optical system to include a zoom lens system, the retractable optical element serving as a part of the zoom lens system.

In an embodiment, a retractable photographic lens is provided, including an optical-axis-direction moving ring which moves rearward along an optical axis of a photographing optical system when the retractable photographic lens moves from an operating state to a fully-retracted state; a retractable-optical-element holding frame which holds a retractable optical element of the photographing optical system and is positioned inside the optical-axis-direction moving ring and pivoted about a pivot thereon to be swingable between a photographing position at which the retractable optical element is aligned with the optical axis and a displaced position at which the retractable optical element is displaced from the photographing position; and a rotatable lens-element-retracting device which rotates the retractable-optical-element holding frame from the photographing position to the displaced position using a rearward moving force of the optical-axis-direction moving ring when the retractable photographic lens moves from the operating state to the fully-retracted state. The rotatable lens-element-retracting device includes a first lens-element-retracting rotating device which gives the retractable-optical-element holding frame a first amount of retractive rotation per unit of movement of the optical-axis-direction moving ring in the optical axis direction; and a second lens-element-retracting rotating device which gives the retractable-optical-element holding frame a second amount of retractive rotation per unit of movement of the optical-axis-direction moving ring in the optical axis direction, the second amount of retractive rotation being smaller than the first amount of retractive rotation. A radial distance from the first lens-element-retracting rotating device to the pivot of the retractable-optical-element holding frame is different from a radial distance from the second lens-element-retracting rotating device to the pivot of the retractable-optical-element holding frame. When the retractable photographic lens moves from the operating state to the fully-retracted state, the first lens-element-retracting rotating device firstly rotates the retractable-optical-element holding frame toward the displaced position and subsequently the second lens-element-retracting rotating device rotates the retractable-optical-element holding frame to the displaced position.

According to the present invention, the retractable optical element can be moved to the displaced position with a high degree of precision, resulting in no increase in size of the retractable photographic lens, since the lens-element-retracting driving device firstly moves the retractable-optical-element holding frame toward the displaced position swiftly by the first lens-element-retracting driving device and subsequently further moves the retractable-optical-element holding frame to the displaced position precisely by the second lens-element-retracting driving device when the retractable photographic lens moves from the operating state to the fully-retracted state.

The present disclosure relates to subject matter contained in Japanese Patent Application No. 2006-23214 (filed on Jan. 31, 2006), which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
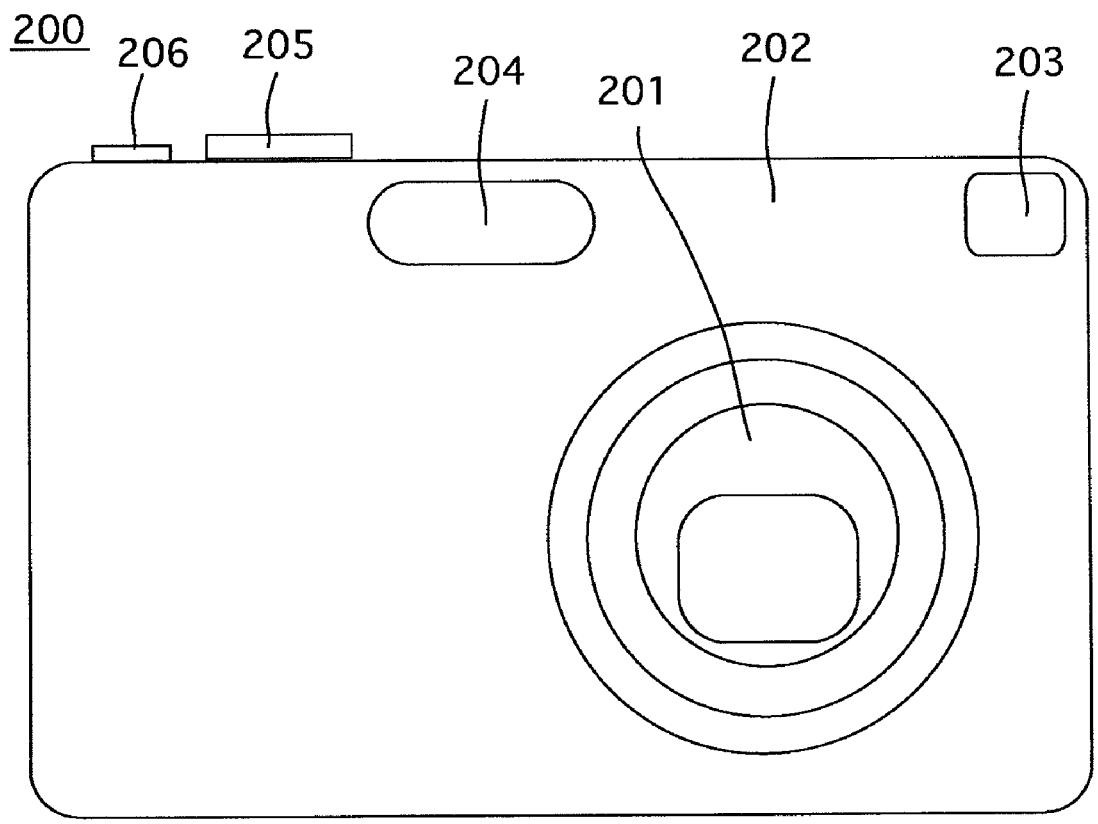
FIG. 1 is a front elevational view of an embodiment of a digital camera incorporating a retractable zoom lens according to the present invention.

FIG. 1 shows an outward appearance of a digital camera 200 which incorporates a retractable zoom lens according to the present invention. The digital camera 200 is provided on the front of a camera body 202 thereof with a zoom lens (zoom lens barrel) 201, an optical viewfinder 203 and a flash 204, and is provided on the top of the camera body 202 with a shutter button 205 and a main switch 206.

Figure 2:
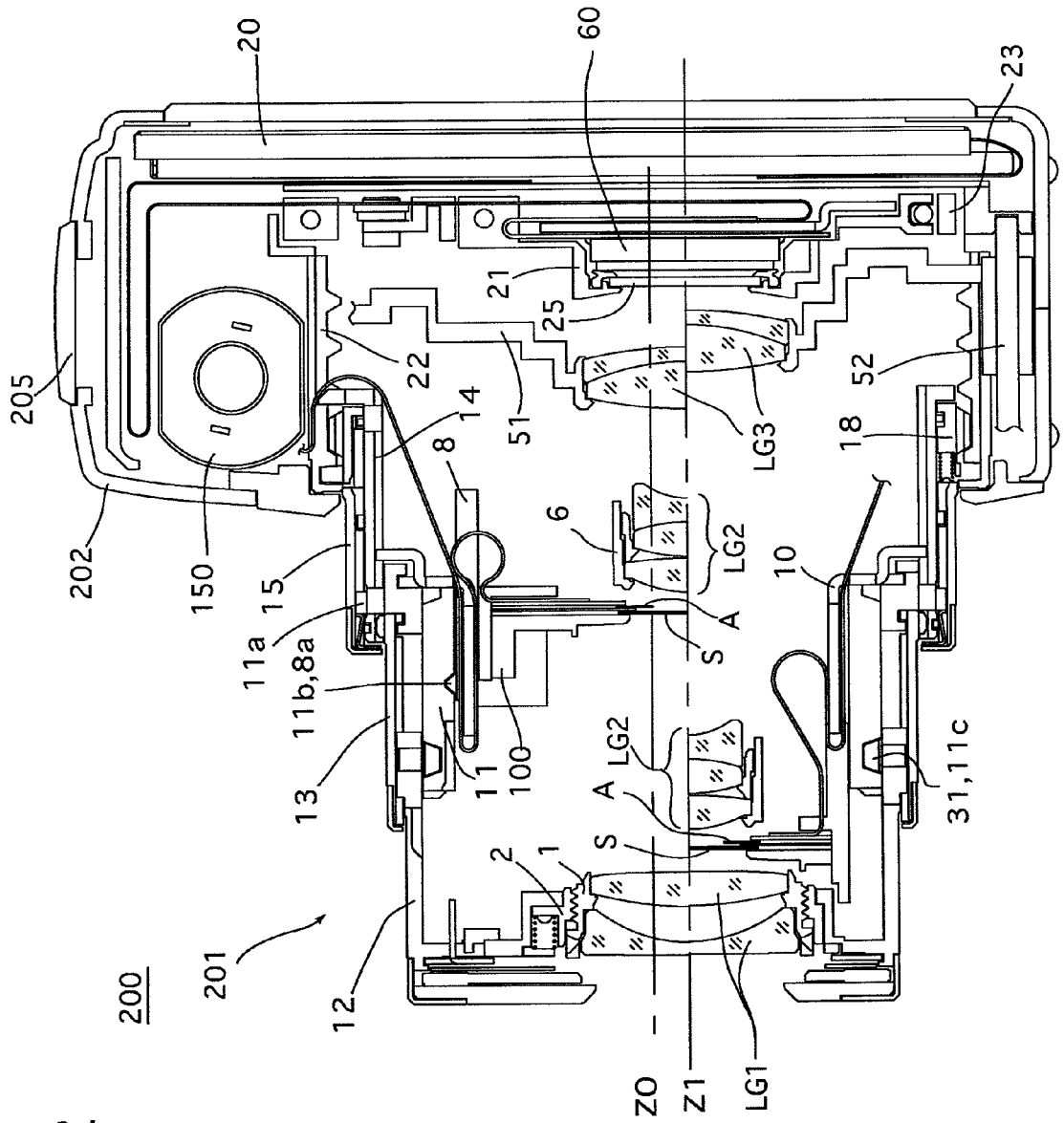
FIG. 2 is a longitudinal sectional view of the digital camera shown in FIG. 1 in a ready-to-photograph state of the zoom lens thereof.
Figure 3:
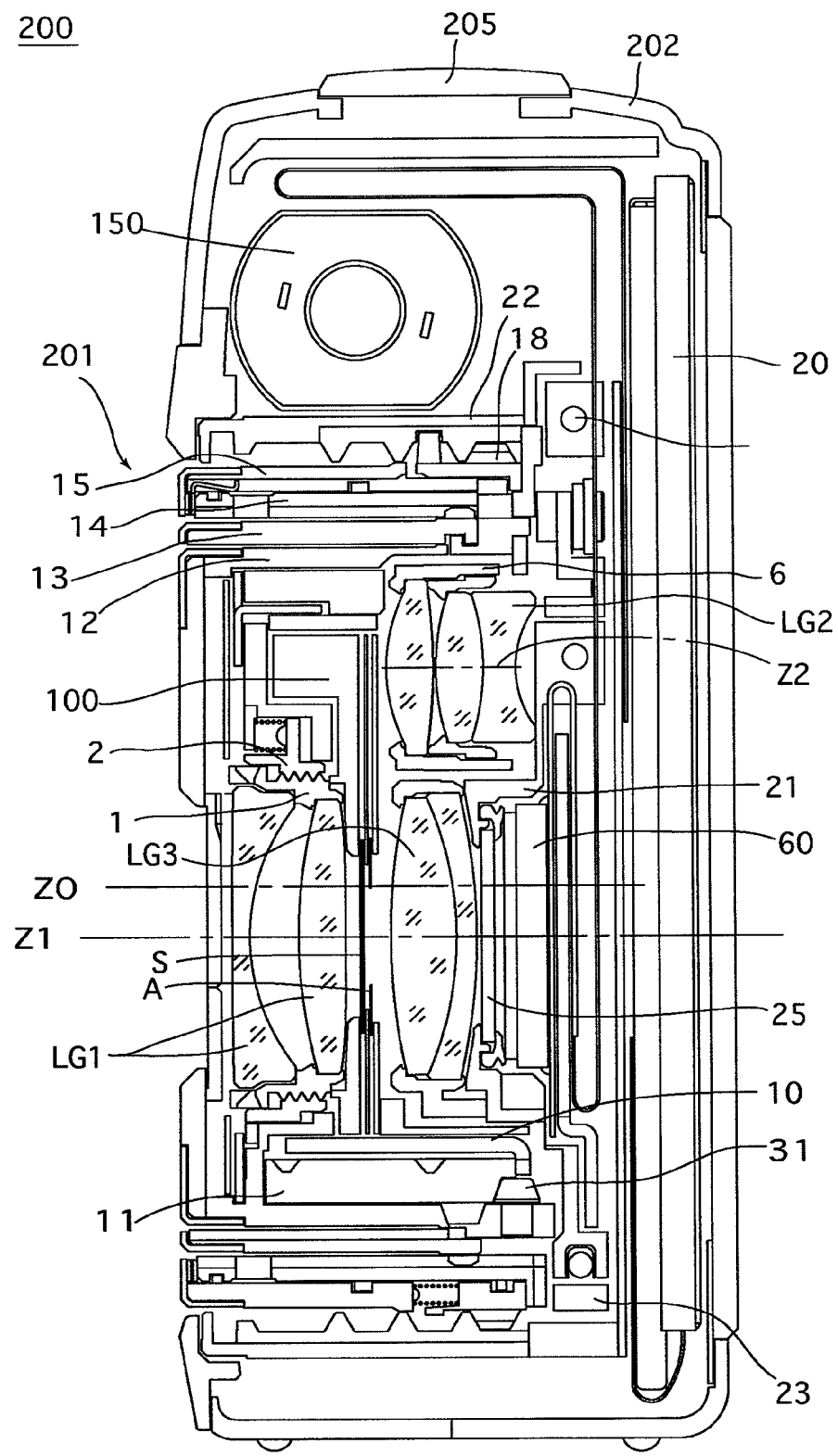
FIG. 3 is a longitudinal sectional view of the digital camera shown in FIG. 1 in the fully-retracted state of the zoom lens.
Figure 5:
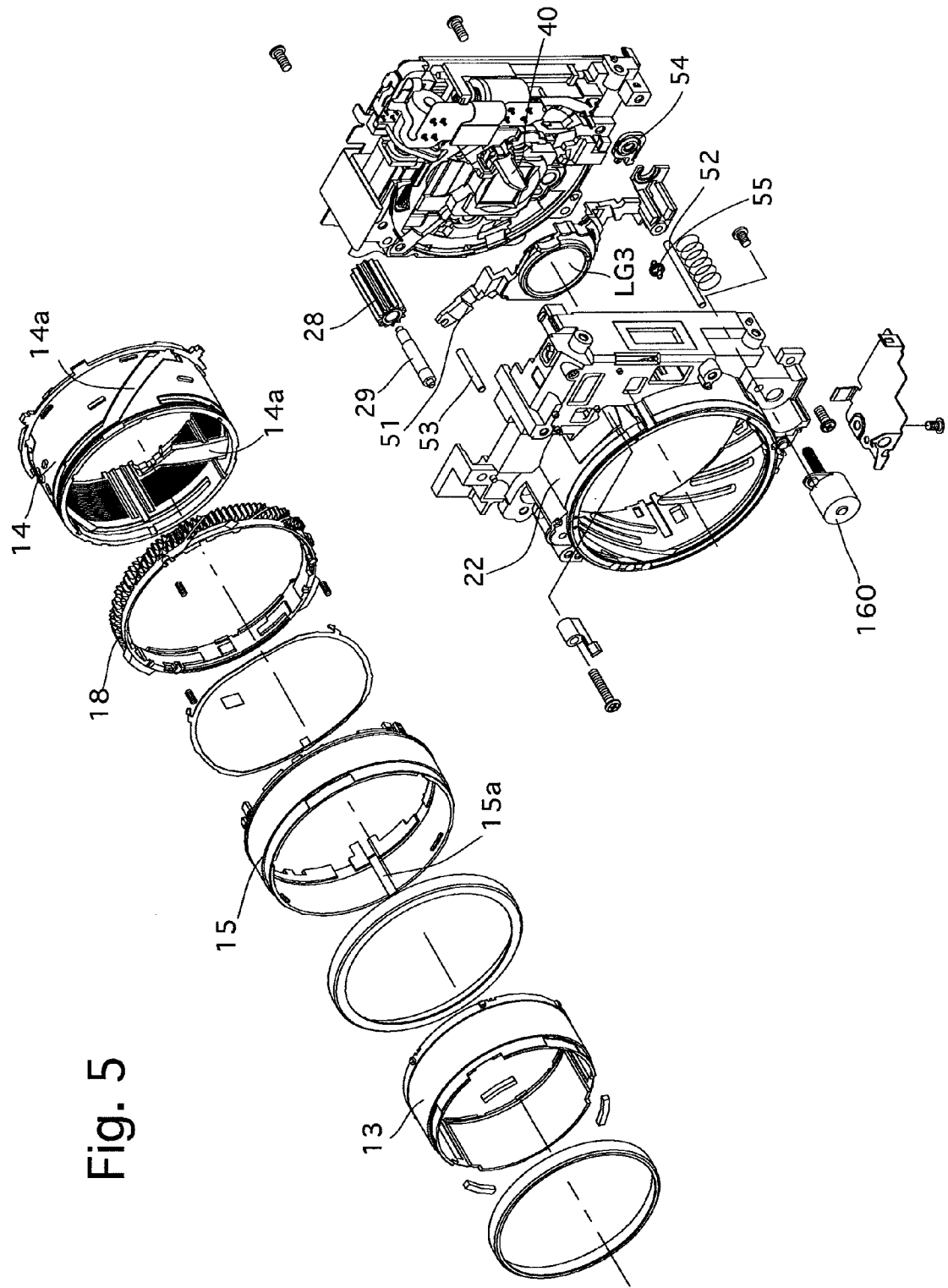
FIG. 5 is an exploded perspective view of a portion of the zoom lens shown in FIG. 4.
Figure 6:
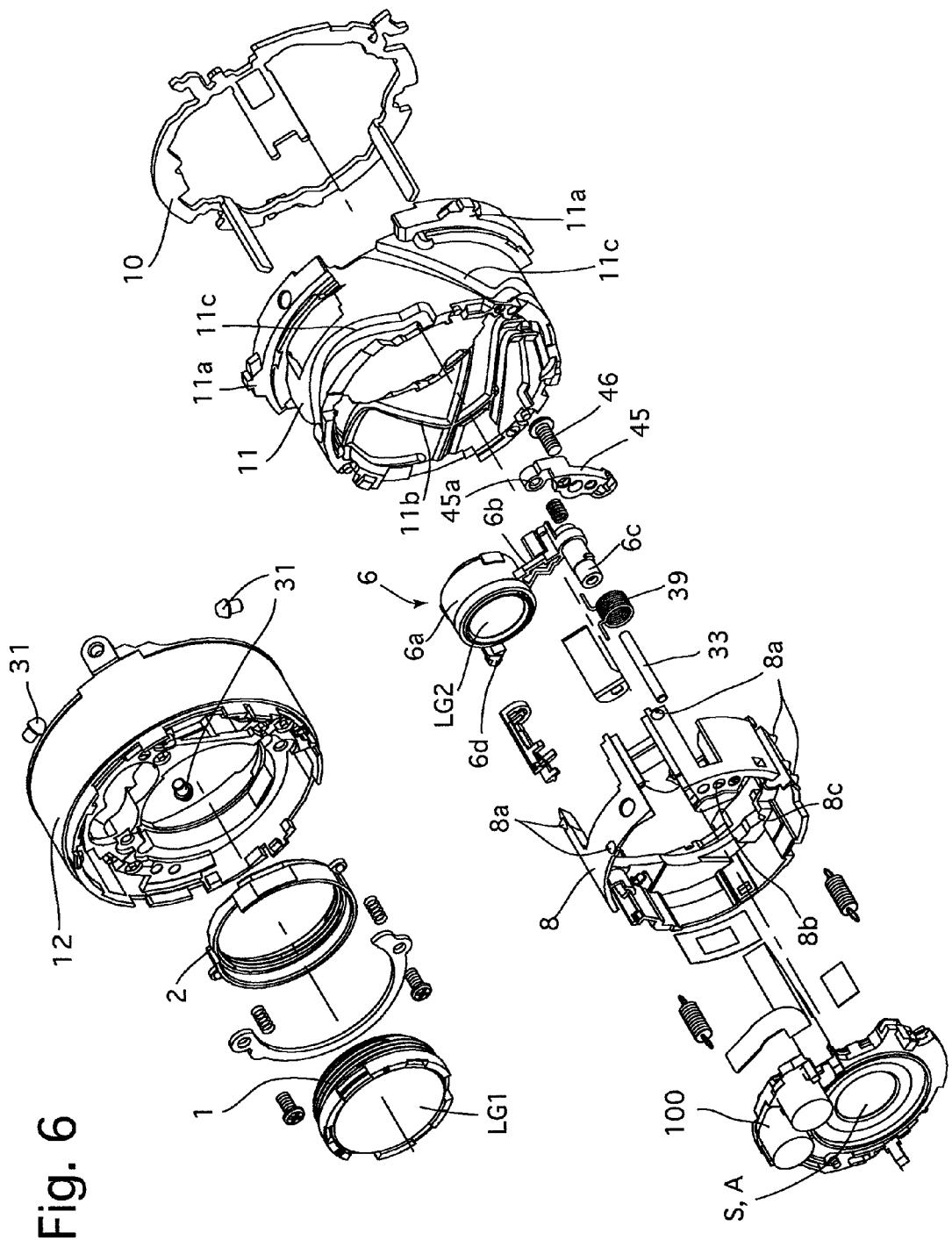
FIG. 6 is an exploded perspective view of another portion of the zoom lens shown in FIG. 4.
Figure 7:
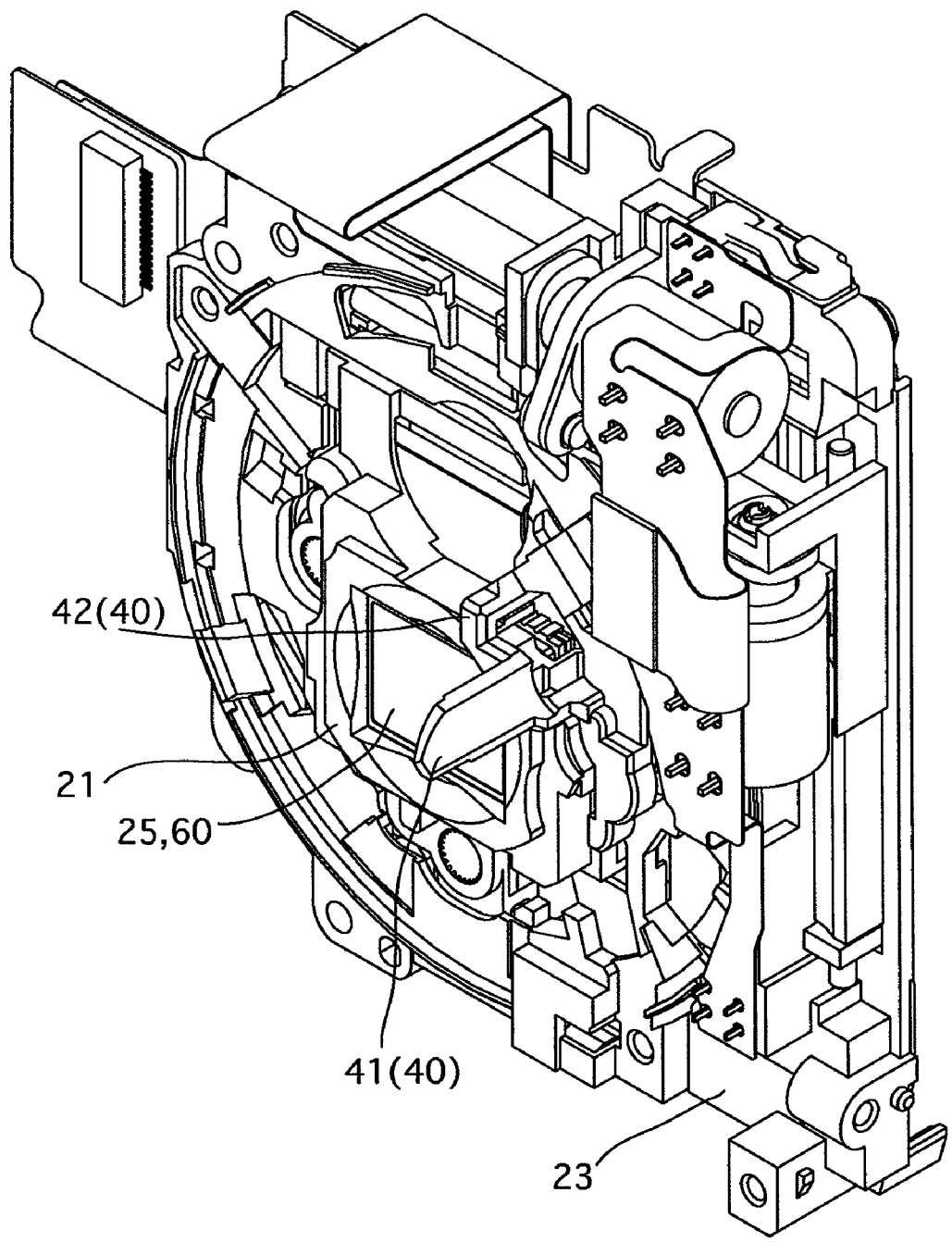
FIG. 7 is an enlarged perspective view of a portion of the elements shown in FIG. 5 in the vicinity of a stationary holder of the zoom lens.
Figure 8:
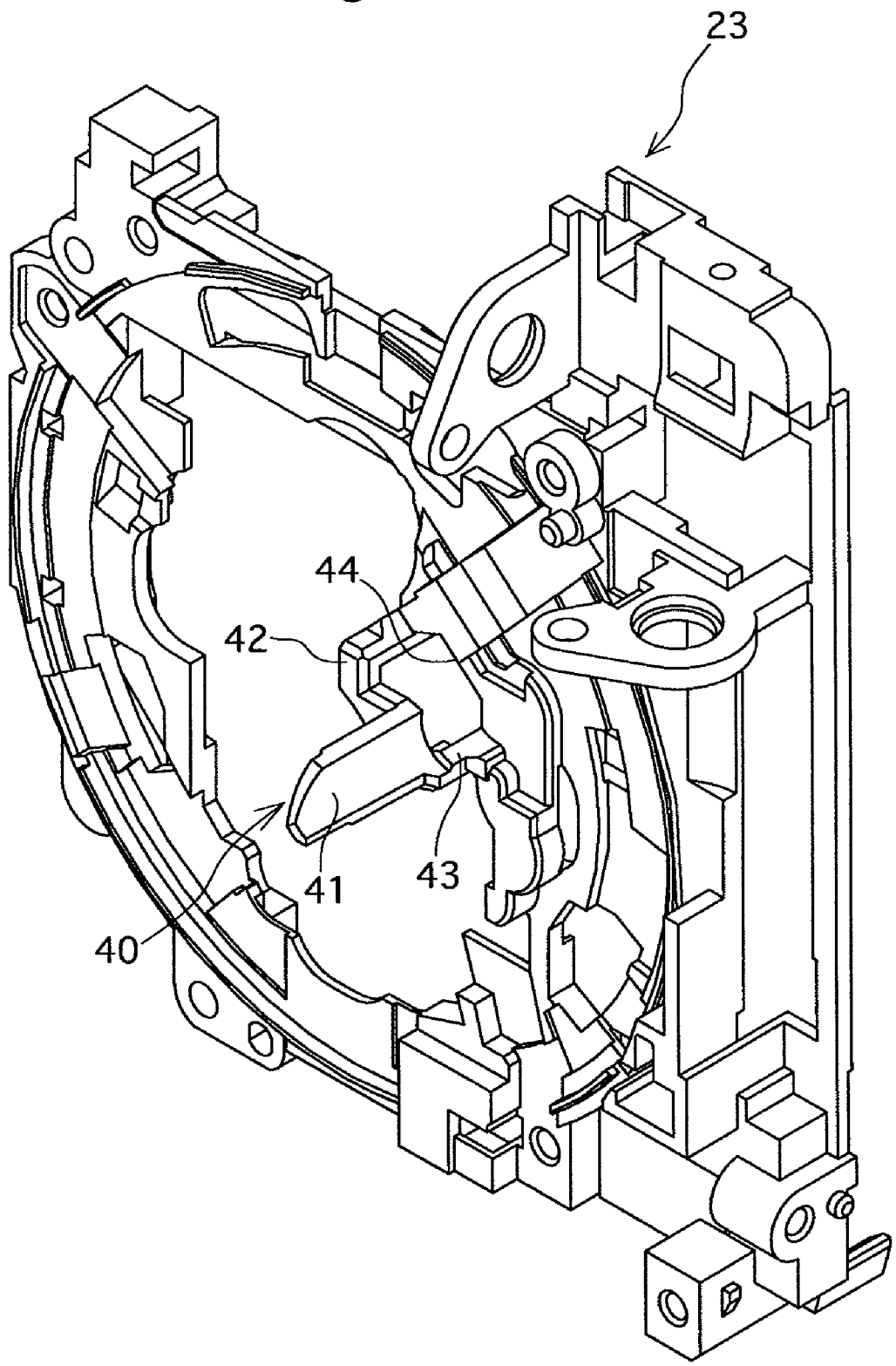
FIG. 8 is a perspective view of the stationary holder.

The zoom lens 201 of the digital camera 200, longitudinal sectional views of which are shown in FIGS. 2 and 3, is driven to advance toward the object side (leftward as viewed in FIGS. 2 and 3) from the camera body 202 as shown in FIG. 2 during a photographing operation. When photography is not carried out (e.g., upon the main switch 206 being turned OFF), the digital camera 200 moves from a ready-to-photograph state (operating state) shown in FIG. 2 to a fully-retracted state shown in FIG. 3 in which the zoom lens 201 is accommodated (fully retracted) in the camera body 202. In FIG. 2, the upper half and the lower half of the zoom lens 201 with respect to a photographing optical axis Z1 show a ready-to-photograph state of the zoom lens 201 at the wide-angle extremity and the telephoto extremity, respectively. As shown in FIGS. 5 and 6, the zoom lens 201 is provided with a plurality of ring members (hollow-cylindrical members), i.e., a second linear guide ring 10, a cam ring 11, a third movable barrel 12, a second movable barrel 13, a first linear guide ring 14, a first movable barrel 15, a helicoid ring 18 and a stationary barrel 22 which are substantially concentrically arranged about a common axis that is shown as a lens barrel axis Z0 in FIGS. 2 and 3.

The zoom lens 201 is provided with a photographing optical system including a first lens group LG1, a shutter S, an adjustable diaphragm A, a second lens group (retractable optical element) LG2, a third lens group LG3, a low-pass filter 25 and a CCD image sensor 60 that serves an image pickup device. Each optical element from the first lens group LG1 to the CCD image sensor 60 is positioned on the photographing optical axis (common optical axis) Z1 when the zoom lens 201 is in a ready-to-photograph state. The photographing optical axis Z1 is parallel to the lens barrel axis Z0 and positioned below the lens barrel axis Z0. The first lens group LG1 and the second lens group LG2 are moved along the photographing optical axis Z1 in a predetermined moving manner to perform a zooming operation, and the third lens group LG3 is moved along the photographing optical axis Z1 to perform a focusing operation. In the following description, the term "optical axis direction" refers to a direction parallel to the photographing optical axis Z1 and the terms "object side" and "image side" refers to a forward direction and a rearward direction of the digital camera 200, respectively.

The stationary barrel 22 is positioned in the camera body 202 and fixed thereto, while a stationary holder (rear-mounted member/stationary member) 23 is fixed to a rear portion of the stationary barrel 22. The CCD image sensor 60 and the low-pass filter 25 are supported by the stationary holder 23. The digital camera 200 is provided behind the stationary holder 23 with an LCD panel 20 which indicates visual images and various photographic information.

The zoom lens 201 is provided in the stationary barrel 22 with a third lens frame 51 which supports and holds the third lens group LG3. The zoom lens 201 is provided between the stationary holder 23 and the stationary barrel 22 with a pair of guide shafts 52 and 53 which extend parallel to the photographing optical axis Z1 to guide the third lens frame 51 in the optical axis direction without rotating the third lens frame 51 about the lens barrel axis Z0. As shown in FIG. 5, the third lens frame 51 is biased forward by a third lens frame biasing spring (extension coil spring) 55. The digital camera 200 is provided with a focusing motor 160 having a rotary drive shaft which is threaded to serve as a feed screw, and the rotary drive shaft is screwed through a screw hole formed on an AF nut 54. If the AF nut 54 is moved rearward by a rotation of the rotary drive shaft of the focusing motor 160, the third lens frame 51 is pressed by the AF nut 54 to move rearward. Conversely, if the AF nut 54 is moved forward, the third lens frame 51 follows the AF nut 54 to move forward by the biasing force of the third lens frame biasing spring 55. Due to this structure, the third lens frame 51 can be moved forward and rearward in the optical axis direction.

Figure 4:
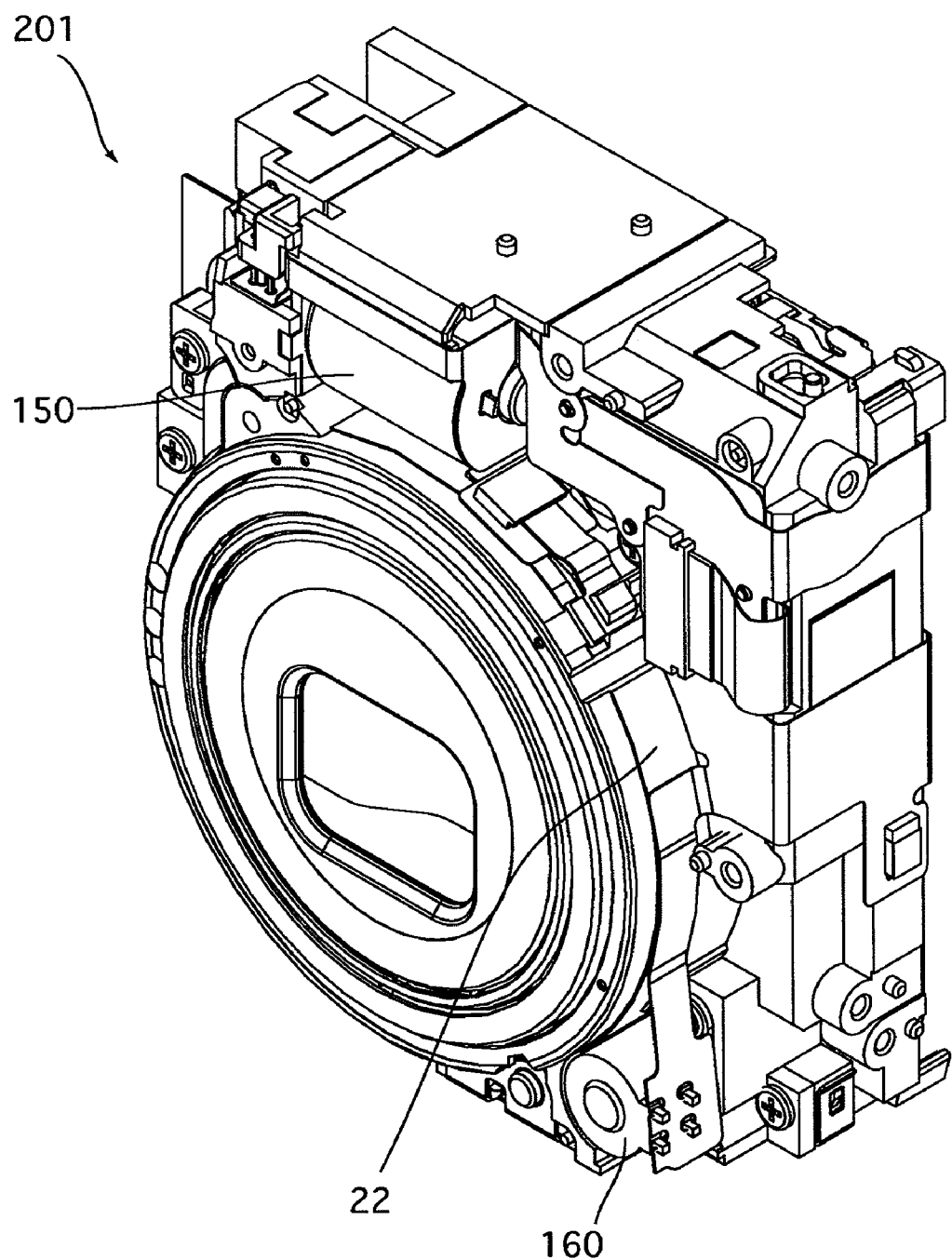
FIG. 4 is a perspective view of the zoom lens of the digital camera shown in FIG. 1 in the fully-retracted state of the zoom lens.

As shown in FIG. 4, the digital camera 200 is provided on the stationary barrel 22 with a zoom motor 150 which is supported by the stationary barrel 22. The driving force of the zoom motor 150 is transferred to a zoom gear 28 (see FIG. 5) via a reduction gear train (not shown). The zoom gear 28 is rotatably fitted on a zoom gear shaft 29 extending parallel to the photographing optical axis Z1. Front and rear ends of the zoom gear shaft 29 are fixed to the stationary barrel 22 and the stationary holder 23, respectively.

The helicoid ring 18 is positioned inside the stationary barrel 22 and supported thereby. The helicoid ring 18 is rotated by a rotation of the zoom gear 28. The helicoid ring 18 is moved forward and rearward in the optical axis direction while being rotated about the lens barrel axis Z0 via a helicoid structure (provided between the helicoid ring 18 and the stationary barrel 22) within a predetermined range in the optical axis direction between the position in the fully-retracted state of the zoom lens 201 shown in FIG. 3 and the position in the state of the zoom lens 201 immediately before the zoom lens 201 enters the ready-to-photograph state thereof at the wide-angle extremity shown by the upper half of the zoom lens 201 in FIG. 2. In a ready-to-photograph state of the zoom lens 201 shown in FIG. 2 (between the wide-angle extremity and the telephoto extremity), the helicoid ring 18 is rotated at a fixed position without moving in the optical axis direction. The first movable barrel 15 is coupled to the helicoid ring 18 to be rotatable together with the helicoid ring 18 about the lens barrel axis Z0 and to be movable together with the helicoid ring 18 in the optical axis direction.

The first linear guide ring 14 is positioned inside the first movable barrel 15 and the helicoid ring 18 and supported thereby. The first linear guide ring 14 is guided linearly in the optical axis direction via linear guide grooves formed on the stationary barrel 22, and is engaged with the first movable barrel 15 and the helicoid ring 18 to be rotatable about the lens barrel axis Z0 relative to the first movable barrel 15 and the helicoid ring 18, and to be movable in the optical axis direction together with the first movable barrel 15 and the helicoid ring 18.

As shown in FIG. 5, the first linear guide ring 14 is provided with a set of three through-slots 14a (only two of which appear in FIG. 5) which penetrate through the first linear guide ring 14. Each through-slot 14a includes a circumferential slot portion and an inclined lead slot portion which extends obliquely rearward from one end of the circumferential slot portion. The inclined lead slot portion is inclined to the optical axis direction, and the circumferential slot portion extends circumferentially about the lens barrel axis Z0. A set of three followers 11a (only two of which appear in FIG. 6) which project radially outward from an outer peripheral surface of the cam ring 11 are engaged in the set of three through-slots 14a, respectively. The set of three followers 11a are further engaged in a set of three rotation transfer grooves 15a which are formed on an inner peripheral surface of the first movable barrel 15 and extend parallel to the photographing optical axis Z1 so that the cam ring 11 rotates with the first movable barrel 15. When the set of three followers 11a are engaged in the lead slot portions of the set of three through-slots 14a, respectively, the cam ring 11 is moved forward and rearward in the optical axis direction while being rotated about the lens barrel axis Z0 and guided by the set of three through-slots 14a. On the other hand, when the set of three followers 11a are engaged in the circumferential slot portions of the set of three through-slots 14a, respectively, the cam ring 11 is rotated at a fixed position without moving in the optical axis direction. Similar to the helicoid ring 18, the cam ring 11 is moved forward and rearward in the optical axis direction while being rotated about the lens barrel axis Z0 within a predetermined range in the optical axis direction between the position in the fully-retracted state of the zoom lens 201 shown in FIG. 3 and the position in the state of the zoom lens 201 immediately before the zoom lens 201 enters the ready-to-photograph state thereof at the wide-angle extremity (shown by the upper half of the zoom lens 201 in FIG. 2), and the cam ring 11 is rotated at a fixed position without moving in the optical axis direction in a ready-to-photograph state of the zoom lens 201 shown in FIG. 2 (between the wide-angle extremity and the telephoto extremity).

The first linear guide ring 14 guides the second linear guide ring 10 and the second movable ring 13 linearly in the optical axis direction by linear guide grooves which are formed on an inner peripheral surface of the first linear guide ring 14 extending parallel to the photographing optical axis Z1. The second linear guide ring 10 guides a second lens group moving frame (optical-axis-direction moving ring) 8, which indirectly supports the second lens group LG2, linearly in the optical axis direction, while the second movable barrel 13 guides the third movable barrel 12, which indirectly supports the first lens group LG1, linearly in the optical axis direction. Each of the second linear guide ring 10 and the second movable barrel 13 is supported by the cam ring 11 to be rotatable relative to the cam ring 11 about the lens barrel axis Z0 and to be movable together with the cam ring 11 in the optical axis direction.

The cam ring 11 is provided on an inner peripheral surface thereof with a plurality of inner cam grooves 11b for moving the second lens group LG2, and the second lens group moving frame 8 is provided on an outer peripheral surface thereof with a plurality of cam followers 8a which are engaged in the plurality of inner cam grooves 11b, respectively. Since the second lens group moving frame 8 is guided linearly in the optical axis direction without rotating via the second linear guide ring 10, a rotation of the cam ring 11 causes the second lens group moving frame 8 to move in the optical axis direction in a predetermined moving manner in accordance with contours of the plurality of inner cam grooves 11b.

Figure 12:
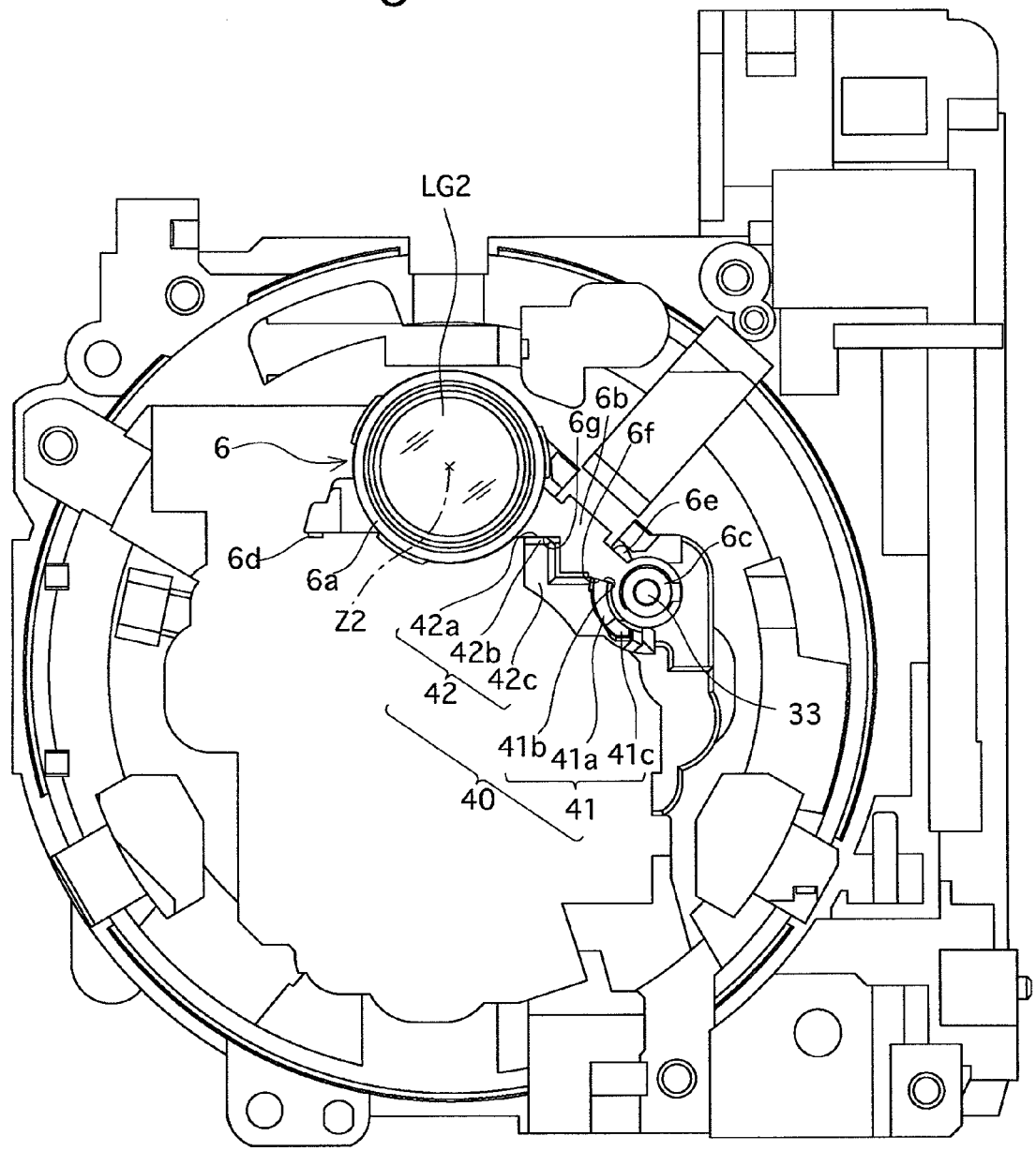
FIG. 12 is a front elevational view of the second lens frame, the stationary holder and the lens-retracting/guiding projection shown in FIG. 11 in a state where the second lens frame is retracted to the radially-retracted position.

As shown in FIG. 6, the zoom lens 201 is provided inside the second lens group moving frame 8 with a second lens frame (retractable-optical-element holding frame) 6 which supports and holds the second lens group LG2. The second lens frame 6 is supported by the second lens group moving frame 8 to be rotatable (swingable) about a pivot shaft 33. The pivot shaft 33 extends parallel to the photographing optical axis Z1. The second lens frame 6 is swingable about the pivot shaft 33 between a photographing position (shown in FIG. 2) where the second lens group LG2 is positioned on the photographing optical axis Z1, and a radially-retracted position (displaced position; shown in FIG. 3) where the optical axis of the second lens group LG2 is radially retracted away from the photographing optical axis Z1 to be positioned above the photographing optical axis Z1. When the second lens frame 6 moves from the photographing position to the radially-retracted position, the optical axis of the second lens group LG2 moves from the photographing optical axis Z1 to a retracted optical axis Z2 (see FIGS. 3, 12 and 13) positioned above the photographing optical axis Z1. The second lens frame 6 is biased to rotate in a direction toward the aforementioned photographing position of the second lens frame 6 by a torsion spring 39. The stationary holder 23 is provided with a lens-retracting/guiding projection (lens-element-retracting device/rotatable lens-element-retracting device) 40 which projects forward from the stationary holder 23 to be engageable with the second lens frame 6 so that the lens-retracting/guiding projection 40 comes into pressing contact with the second lens frame 6 to rotate the second lens frame 6 to the radially-retracted position thereof against the biasing force of the torsion spring 39 when the second lens group moving frame 8 moves rearward in a retracting direction to approach the stationary holder 23.

The second movable barrel 13, which is guided linearly in the optical axis direction without rotating by the second linear guide ring 10, guides the third movable barrel 12 linearly in the optical axis direction. The third movable barrel 12 is provided on an inner peripheral surface thereof with a set of three cam followers 31 (see FIG. 6) which project radially inwards, and the cam ring 11 is provided on an outer peripheral surface thereof with a set of three outer cam grooves 11c (cam grooves for moving the first lens group LG1; only two of them appear in FIG. 6) in which the set of three cam followers 31 are slidably engaged, respectively. The zoom lens 201 is provided inside the third movable barrel 12 with a first lens frame 1 which is supported by the third movable barrel 12 via a first lens group adjustment ring 2. The first lens frame 1 directly holds and supports the first lens group LG1.

The zoom lens 201 is provided between the first and second lens groups LG1 and LG2 with a shutter unit 100 including the shutter S and the adjustable diaphragm A. The shutter unit 100 is positioned inside the second lens group moving frame 8 and fixed thereto.

Operations of the zoom lens 201 that has the above described structure will be discussed hereinafter. Upon the main switch 206 being turned ON in the fully-retracted state of the zoom lens 201 shown in FIG. 3, the zoom motor 150 is driven to rotate in a lens barrel advancing direction. This rotation of the zoom motor 150 rotates the zoom gear 28. The rotation of the zoom gear 28 causes a combination of the first movable barrel 15 and the helicoid ring 18 to move forward while rotating about the lens barrel axis Z0 due to the aforementioned helicoid structure, and further causes the first linear guide ring 14 to move forward linearly together with the first movable barrel 15 and the helicoid ring 18. During this movement, the cam ring 11 which rotates by rotation of the first movable barrel 15 moves forward in the optical axis direction by an amount of movement corresponding to the sum of the amount of the forward movement of the first linear guide ring 14 and the amount of the forward movement of the cam ring 11 via a leading structure between the first linear guide ring 14 and the cam ring 11, i.e., by the engagement of the inclined lead slot portions of the set of three through-slots 14a with the set of three followers 11a of the cam ring 11, respectively. Once the helicoid ring 18 and the cam ring 11 advance to respective predetermined positions, the functions of a rotating/advancing mechanism (the aforementioned helicoid structure) between the helicoid ring 18 and the stationary barrel 22 and another rotating/advancing mechanism (the aforementioned leading structure) between the cam ring 11 and the first linear guide ring 14 are canceled, so that each of the helicoid ring 18 and the cam ring 11 rotates about the lens barrel axis Z0 without moving in the optical axis direction.

A rotation of the cam ring 11 causes the second lens group moving frame 8, which is positioned inside the cam ring 11 and guided linearly in the optical axis direction via the second linear guide ring 10, to move in the optical axis direction with respect to the cam ring 11 in a predetermined moving manner due to the engagement of the set of three cam followers 8a with the set of three inner cam grooves 11b, respectively. In the state shown in FIG. 3, in which the zoom lens 201 is in the fully-retracted state, the second lens frame 6, which is positioned inside the second lens group moving frame 8, is held in the radially-retracted position, off the photographing optical axis Z1 via the action of the lens-retracting/guiding projection 40, which projects forward from the stationary holder 23. During the course of movement of the second lens group moving frame 8 from the retracted position to a position in the zooming range, the second lens frame 6 is disengaged from the lens-retracting/guiding projection 40 to rotate about the pivot shaft 33 from the radially-retracted position to the photographing position shown in FIG. 2, so that the optical axis of the second lens group LG2 coincides with the photographing optical axis Z1, by the spring force of the torsion spring 39.

Thereafter, the second lens frame 6 remains held at the photographing position until the zoom lens 201 is retracted into the camera body 201.

In addition, a rotation of the cam ring 11 causes the third movable barrel 12, which is positioned around the cam ring 11 and guided linearly in the optical axis direction via the second movable barrel 13, to move in the optical axis direction relative to the cam ring 11 in a predetermined moving manner due to the engagement of the set of three cam followers 31 with the set of three outer cam grooves 11c of the cam ring 11, respectively.

Accordingly, an axial position of the first lens group LG1 relative to the imaging plane (imaging surface/light receiving surface of the CCD image sensor 60) when the first lens group LG1 is moved forward from the fully-retracted position is determined by the sum of the amount of forward movement of the cam ring 11 relative to the stationary barrel 22 and the amount of movement of the third external barrel 12 relative to the cam ring 11, and an axial position of the second lens group LG2 relative to the imaging plane when the second lens group LG2 is moved forward from the fully-retracted position is determined by the sum of the amount of forward movement of the cam ring 11 relative to the stationary barrel 22 and the amount of movement of the second lens group moving frame 8 relative to the cam ring 11. A zooming operation is carried out by moving the first and second lens groups LG1 and LG2 on the photographing optical axis Z1 while changing the air distance therebetween. When the zoom lens 201 is driven to advance from the fully-retracted position shown in FIG. 3, the zoom lens 201 firstly moves to a position shown above the photographic lens axis Z1 in FIG. 2 in which the zoom lens 201 is at the wide-angle extremity. Subsequently, the zoom lens 201 moves to a position shown below the photographic lens axis Z1 in FIG. 2 in which the zoom lens 201 is at the telephoto extremity by a further rotation of the zoom motor 150 in a lens barrel advancing direction thereof. As can be understood from FIG. 2, the space between the first and second lens groups LG1 and LG2 when the zoom lens 201 is at the wide-angle extremity is greater than when the zoom lens 201 is at the telephoto extremity. When the zoom lens 201 is at the telephoto extremity as shown below the photographic lens axis Z1 in FIG. 2, the first and second lens groups LG1 and LG2 have moved to approach each other to have an air-distance therebetween which is smaller than the air-distance in the zoom lens 201 at the wide-angle extremity. This variation of the air distance between the first and second lens groups LG1 and LG2 for the zooming operation is achieved by contours of the plurality of inner cam grooves 11b (for moving the second lens group LG2) and the set of three outer cam grooves 11c (for moving the first lens group LG1) of the cam ring 11. In the zooming range between the wide-angle extremity and the telephoto extremity, the cam ring 11, the first movable barrel 15 and the helicoid ring 18 rotate at their respective axial fixed positions, i.e., without moving in the optical axis direction.

In a ready-to-photograph state of the zoom lens 201 between the wide-angle extremity and the telephoto extremity, a focusing operation is carried out by moving the third lens group LG3 (the third lens frame 51) along the photographing optical axis Z1 by driving the AF motor 160 in accordance with object distance information obtained by a distance measuring device of the digital camera 200.

Upon the main switch 206 being turned OFF, the zoom motor 150 is driven to rotate in a lens barrel retracting direction so that the zoom lens 201 operates in the reverse manner to the above described advancing operation to fully retract the zoom lens 201 into the camera body 202 as shown in FIG. 3.

During this retracting movement of the zoom lens 201, the second lens frame 6 rotates about the pivot shaft 33 to the radially-retracted position by the lens-retracting/guiding projection 40 (see FIG. 10) while moving rearward together with the second lens group moving frame 8. When the zoom lens 201 is fully retracted into the camera body 202, the second lens group LG2 is retracted into the space radially outside the space in which the third lens group LG3, the low-pass filter LG4 and the CCD image sensor 60 are retracted as shown in FIG. 3, i.e., the second lens group LG2 is radially retracted into an axial range substantially identical to an axial range in the optical axis direction in which the third lens group LG3, the low-pass filter LG4 and the CCD image sensor 60 are positioned. This structure of the digital camera 200 for retracting the second lens group LG2 in this manner reduces the length of the zoom lens 201 when the zoom lens 201 is fully retracted, thus making it possible to reduce the thickness of the camera body 202 in the optical axis direction, i.e., in the horizontal direction as viewed in FIG. 3.

Figure 9:
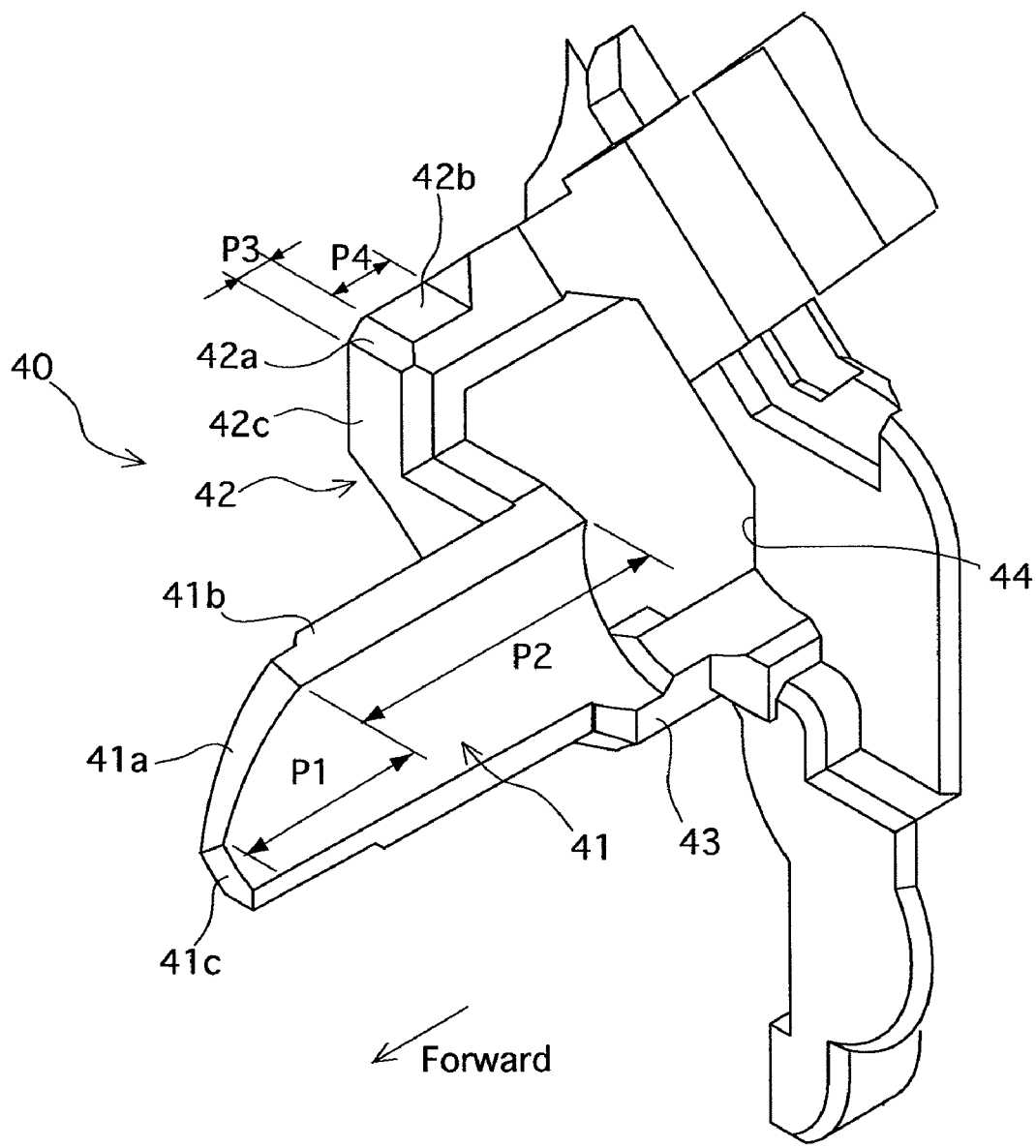
FIG. 9 is an enlarged perspective view of a portion of the stationary holder which includes a lens-retracting/guiding projection that is formed integral with the stationary holder and projects forward therefrom.

The mechanism for radially retracting the second lens group LG2 from the photographing optical axis Z1 when the zoom lens 201 is fully retracted will be discussed hereinafter. As shown in FIGS. 7 through 13, the lens-retracting/guiding projection 40 projects forward in the optical axis direction from the stationary holder 23, and is provided with a first engaging portion (an element of a first lens-retracting driving device/first rear-mounted engaging portion) 41, a second engaging portion (an element of a second lens-retracting driving device/second rear-mounted engaging portion) 42 and a bridge portion 43, which are formed integral with one another. The first engaging portion 41 projects by a greater amount than that of the second engaging portion 42. The second engaging portion 42 is positioned at the rear end of the first engaging portion 41. As shown in FIG. 9 as an enlarged view, the second engaging portion 42, together with the bridge portion 43, supports the base of the first engaging portion 41. A through space (through hole) 44 is formed in the stationary holder 23 immediately behind the first engaging portion 41 between the second engaging portion 42 and the bridge portion 43.

The first engaging portion 41 is shaped as part of a hollow cylinder about the pivot shaft 33. As shown in FIG. 9, the first engaging portion 41 is provided with a front end surface 41c, a lens-retracting/guiding surface 41a which is formed so as to be continuous with the front end surface 41c and inclined to the photographing optical axis Z1 (the optical axis direction) to serve as a cam edge (cam surface), and an optical-axis-direction flat surface (holding surface) 41b which is formed on a top surface of the first engaging portion 41 so as to be continuous with the lens-retracting/guiding surface 41a and extend parallel to the photographing optical axis Z1. The lens-retracting/guiding surface 41a is formed in such a manner as to chamfer a portion of the first engaging portion 41 between the optical-axis-direction flat surface 41b and the front end surface 41c. The lens-retracting/guiding surface 41a is formed as an inclined surface, the forward-projecting amount of which in the optical axis direction gradually increases in a direction from the optical-axis-direction flat surface 41b to the front end surface 41c. In other words, the lens-retracting/guiding surface 41a is inclined forward in a direction from the upper end to the lower end of the retracting/guiding surface 41a as viewed in FIG. 9.

As shown in FIG. 9, the second engaging portion 42 is provided with a front surface 42c, a lens-retracting/guiding surface 42a which is formed continuous with the front surface 42c and inclined to the photographing optical axis Z1, and an optical-axis-direction flat surface (holding surface) 42b which is formed on a top surface of the second engaging portion 42 so as to be continuous with the lens-retracting/guiding surface 42a to extend parallel to the photographing optical axis Z1. The lens-retracting/guiding surface 42a is formed in such a manner so as to chamfer a portion of the second engaging portion 42 between the optical-axis-direction flat surface 42b and the front end surface 42c. The lens-retracting/guiding surface 42a is formed as an inclined surface, the forward-projecting amount of which in the optical axis direction gradually increases in a direction from the optical-axis-direction flat surface 42b to the front end surface 42c. In other words, the lens-retracting/guiding surface 42a is inclined forward in a direction from the upper end to the lower end of the retracting/guiding surface 42a as viewed in FIG. 9. The lens-retracting/guiding surface 41a and the lens-retracting/guiding surface 42a have substantially the same lead angle (angle of inclination) relative to the photographing optical axis Z1.

The positions of the first engaging portion 41 and the second engaging portion 42 are mutually different in the optical axis direction. In FIG. 9, "P1", "P2", "P3" and "P4" designate the ranges of formation of the lens-retracting/guiding surface 41a, the optical-axis-direction flat surface 41b, the lens-retracting/guiding surface 42a, and the optical-axis-direction flat surface 42b, in the optical axis direction, respectively. As can be seen from FIG. 9, the range of formation P1 of the lens-retracting/guiding surface 41a is positioned in front of the range of formation P3 of the lens-retracting/guiding surface 42a in the optical axis direction. Additionally, the range of formation P3 of the lens-retracting/guiding surface 42a and a part of the range of formation P4 of the optical-axis-direction flat surface 42b overlap a rear end part of the range of formation P2 of the optical-axis-direction flat surface 41b in the optical axis direction.

Figure 13:
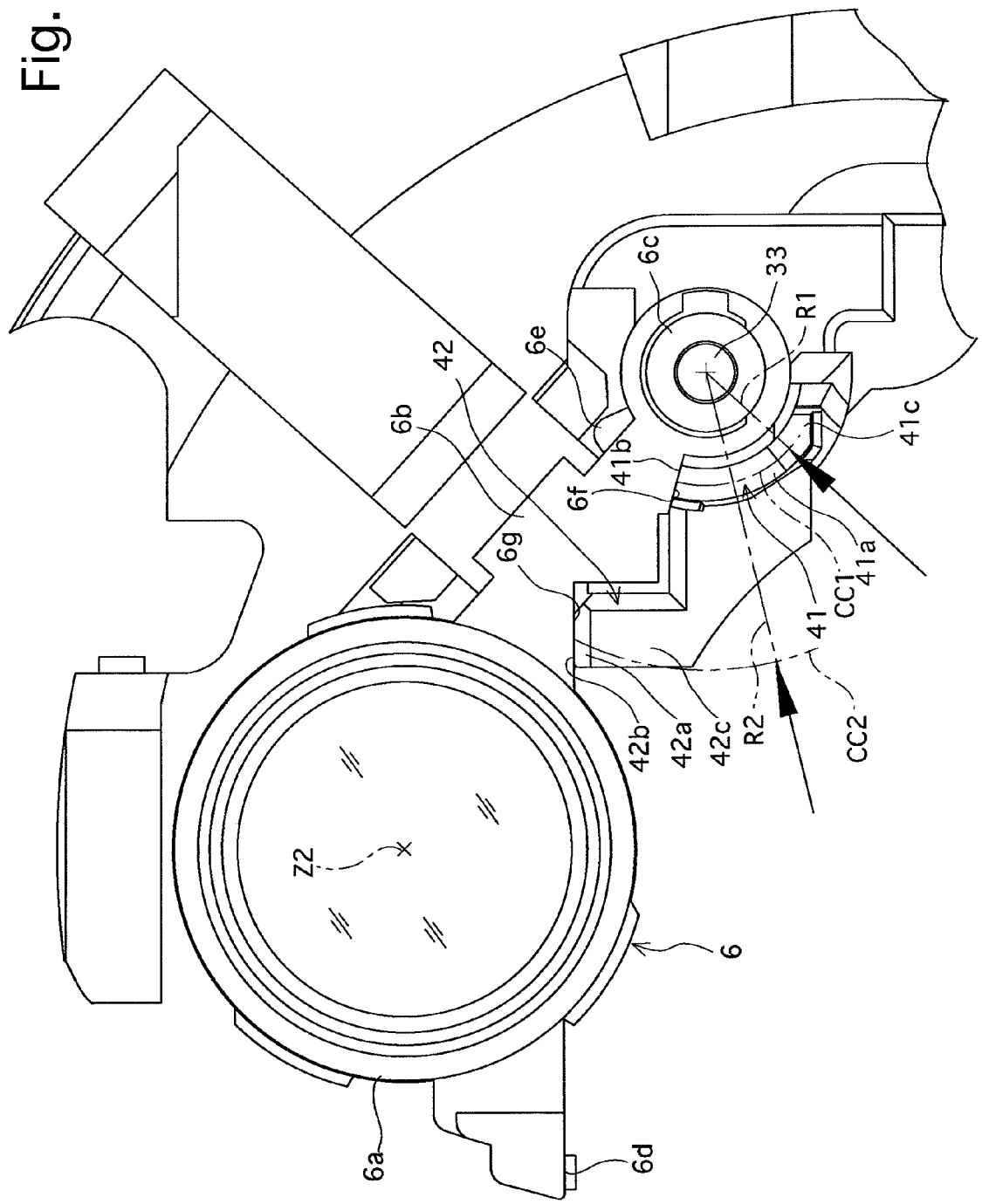
FIG. 13 is an enlarged front elevational view of a portion of the elements shown in FIG. 12 in the vicinity of the second lens frame and the lens-retracting/guiding projection.

The positions of the first engaging portion 41 and the second engaging portion 42 are mutually different also in a radial direction with respect to the pivot shaft 33. FIG. 13 shows the positional relationship between the first engaging portion 41 and the second engaging portion 42 in a radial direction with respect to the pivot shaft 33. As can be seen in FIG. 13, the first engaging portion 41 is close to the pivot shaft 33 in a radial direction with respect to the pivot shaft 33, and the second engaging portion 42 is positioned farther from the pivot shaft 33 than the first engaging portion 41 in a radial direction with respect to the pivot shaft 33. More specifically, if two concentric circles CC1 and CC2 (both of them are partly shown in FIG. 13) both centered on the axis of the pivot shaft 33 are scribed so as to pass through the centers of the optical-axis-direction flat surfaces 41b and 42b in the widthwise directions thereof, respectively, the radius R1 of the circle CC1 that is positioned on the first engaging portion 41 is smaller than the radius R2 of the circle CC2 that is positioned on the second engaging portion 42 (R2>R1).

Figure 14:
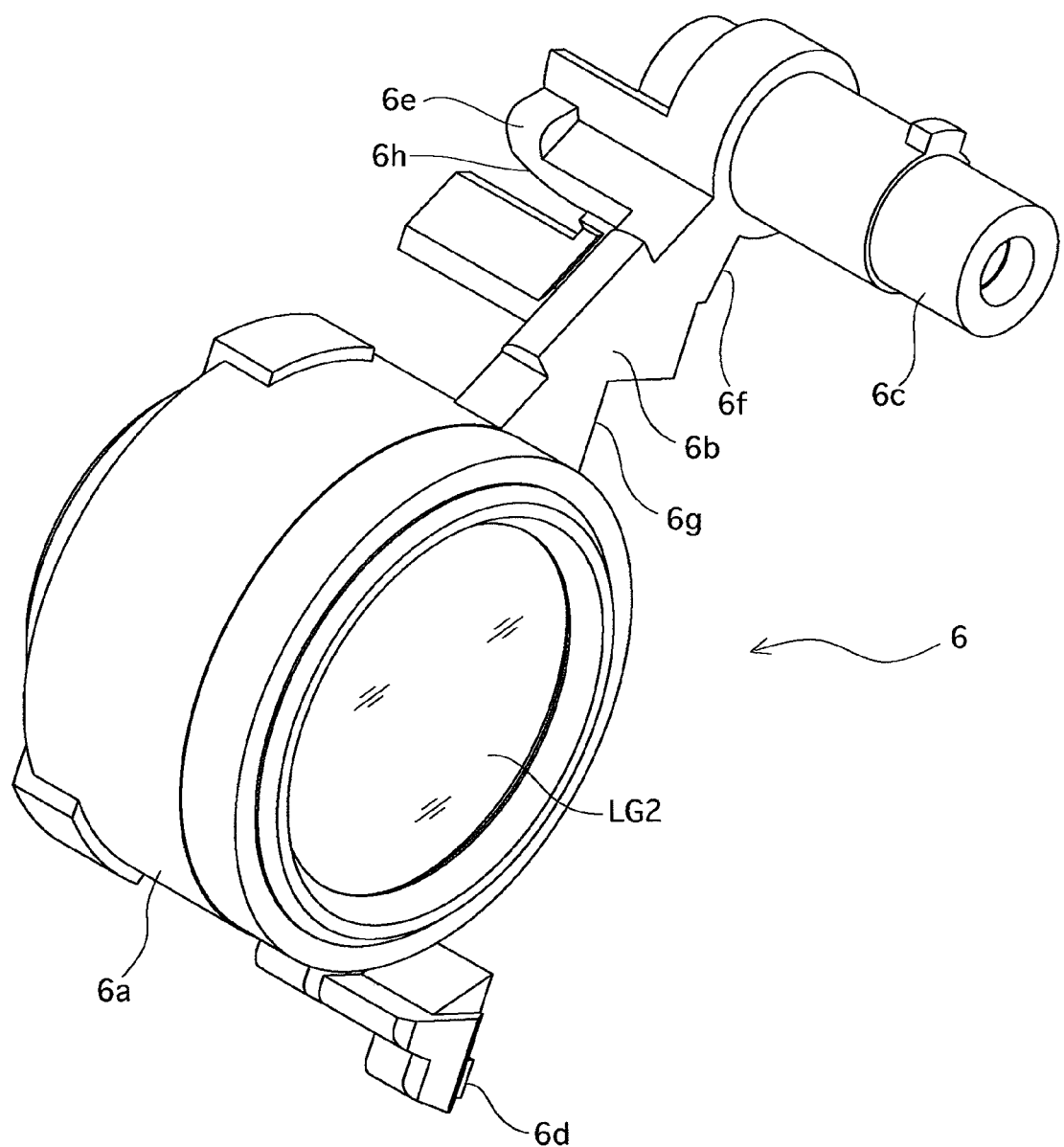
FIG. 14 is front perspective view of the second lens frame.

As shown in FIG. 14, the second lens frame 6, which is rotated about the pivot shaft 33 to the radially-retracted position by the lens-retracting/guiding projection 40, is provided with a cylindrical lens holder portion 6a, a radial arm portion 6b and a pivoted cylindrical portion 6c. The cylindrical lens holder portion 6a directly holds and supports the second lens group L2. The radial arm portion 6b extends radially outwards from the cylindrical lens holder portion 6a in a radial direction thereof to connect the cylindrical lens holder portion 6a to the pivoted cylindrical portion 6c. The pivoted cylindrical portion 6c is fixed at the radially outer end of the radial arm portion 6b. The pivot shaft 33 is inserted into a through hole formed in the pivoted cylindrical portion 6c through the axis thereof. The front and rear ends of the pivot shaft 33 are fitted into a bearing hole 8b formed in the second lens group moving frame 8 and a bearing hole 45a made in a shaft support member 45, respectively, (see FIG. 6). The shaft support member 45 is secured to the second lens group moving frame 8 by a set screw 46. As described above, the second lens frame 6 is rotatable (swingable) about the pivot shaft 33 between the photographing position, where the second lens group LG2 is positioned on the photographing optical axis Z1, and the radially-retracted position, where the optical axis of the second lens group LG2 is radially retracted away from the photographing optical axis Z1 to be positioned above the photographing optical axis Z1, and is biased to rotate toward the photographing position of the second lens frame 6 by the torsion spring 39. The second lens frame 6 is further provided with an engaging protrusion 6d which protrudes radially outwards from the cylindrical lens holder portion 6a in a direction away from the radial arm portion 6b. The limit of rotation of the second lens frame 6 about the pivot shaft 33 in the biasing direction of the torsion spring 39, i.e., the photographing position of the second lens frame 6, is determined by the engagement of the engaging protrusion 6d with a stop portion 8c (see FIG. 6) formed on an inner peripheral surface of the second lens group moving frame 8. Accordingly, the engaging protrusion 6d, the stop portion 8c and the torsion spring 39 constitute a device for holding the second lens frame 6 in the photographing position.

Figure 15:
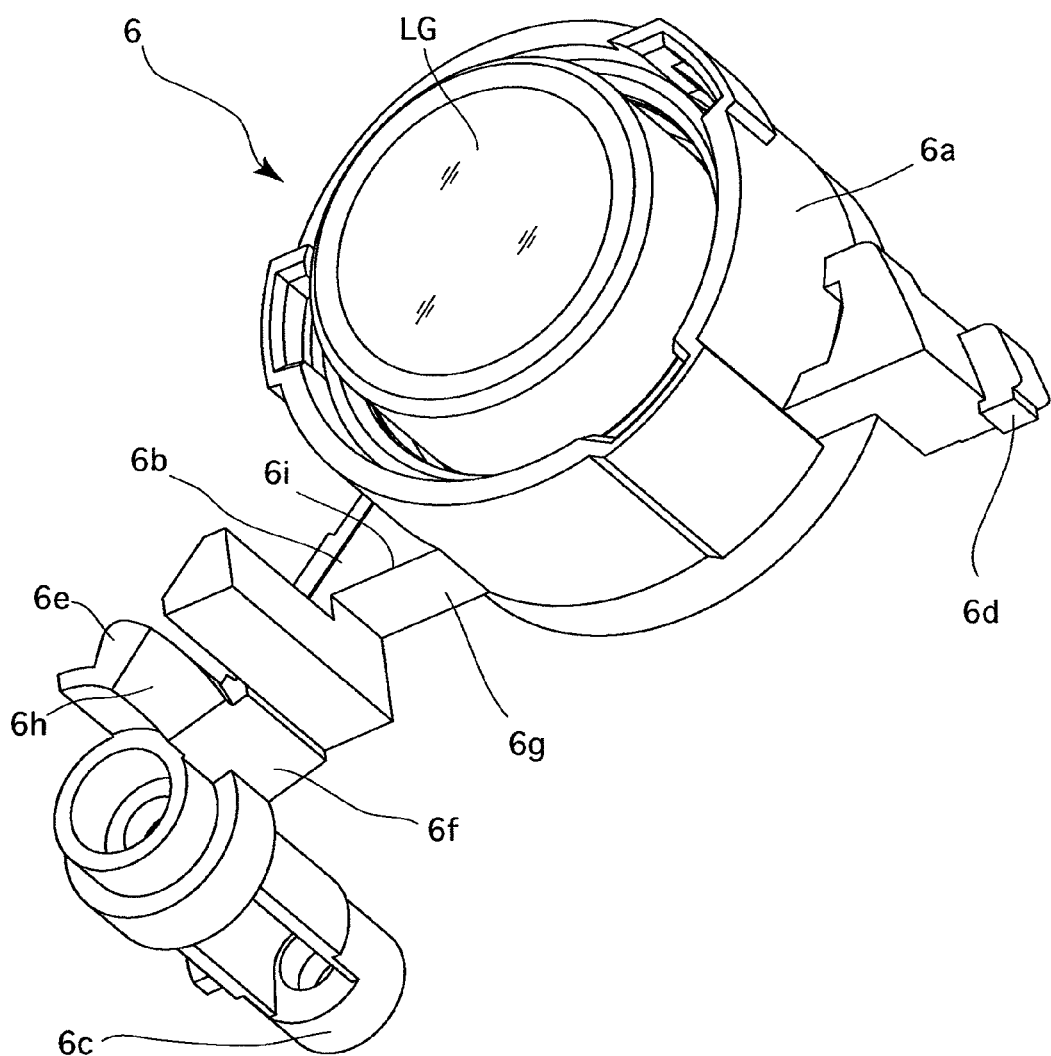
FIG. 15 is a rear perspective view of the second lens frame.

As shown in FIG. 15, the second lens frame 6 is provided with a rear projecting portion 6e which projects rearward in the optical axis direction from the radial arm portion 6b. The rear projecting portion 6e is provided on a lower surface thereof with a lead surface (an element of the first lens-element-retracting driving device/first engaging portion) 6h which extends substantially parallel to the lens-retracting/guiding surface 41a. When the second lens frame 6 is held in the photographing position, the rear projecting portion 6e is positioned in front of the lens-retracting/guiding surface 41a of the first engaging portion 41, and then the lead surface 6h comes into contact with the lens-retracting/guiding surface 41a when the second lens frame 6 is moved with the second lens group moving frame 8 rearward in the optical axis direction. As shown in FIG. 15, the second lens frame 6 is provided, on a rear surface of the radial arm portion 6b at a position closer to the cylindrical lens holder portion 6a than the rear projecting portion 6e, with a contacting edge (an element of the second lens-element-retracting driving device/second engaging portion) 6i. The second lens frame 6 is provided on a lower surface of the radial arm portion 6b with a first retracted state holding surface 6f and a second retracted state holding surface 6g which are located in that order from the pivoted cylindrical portion 6c. The first retracted state holding surface 6f and the second retracted state holding surface 6g are formed on the radial arm portion 6b at different stepped positions. The first retracted state holding surface 6f is formed as a surface communicatively connected to the lead surface 6h, and the second retracted state holding surface 6g is formed as a surface communicatively connected to the contacting edge 6i. The first retracted state holding surface 6f is formed at a position which follows the aforementioned circle CC1 when the second lens frame 6 rotates about the pivot shaft 33, and the second retracted state holding surface 6g is formed at a position which follows the aforementioned circle CC2 when the second lens frame 6 rotates about the pivot shaft 33. Due to this structure, the first retracted-state holding surface 6f can be engaged with an optical-axis-direction flat surface 41b of the first engaging portion 41 and the second retracted-state holding surface 6g can be engaged with an optical-axis-direction flat surface 42b of the second engaging portion 42 (see FIG. 13).

Figure 10:
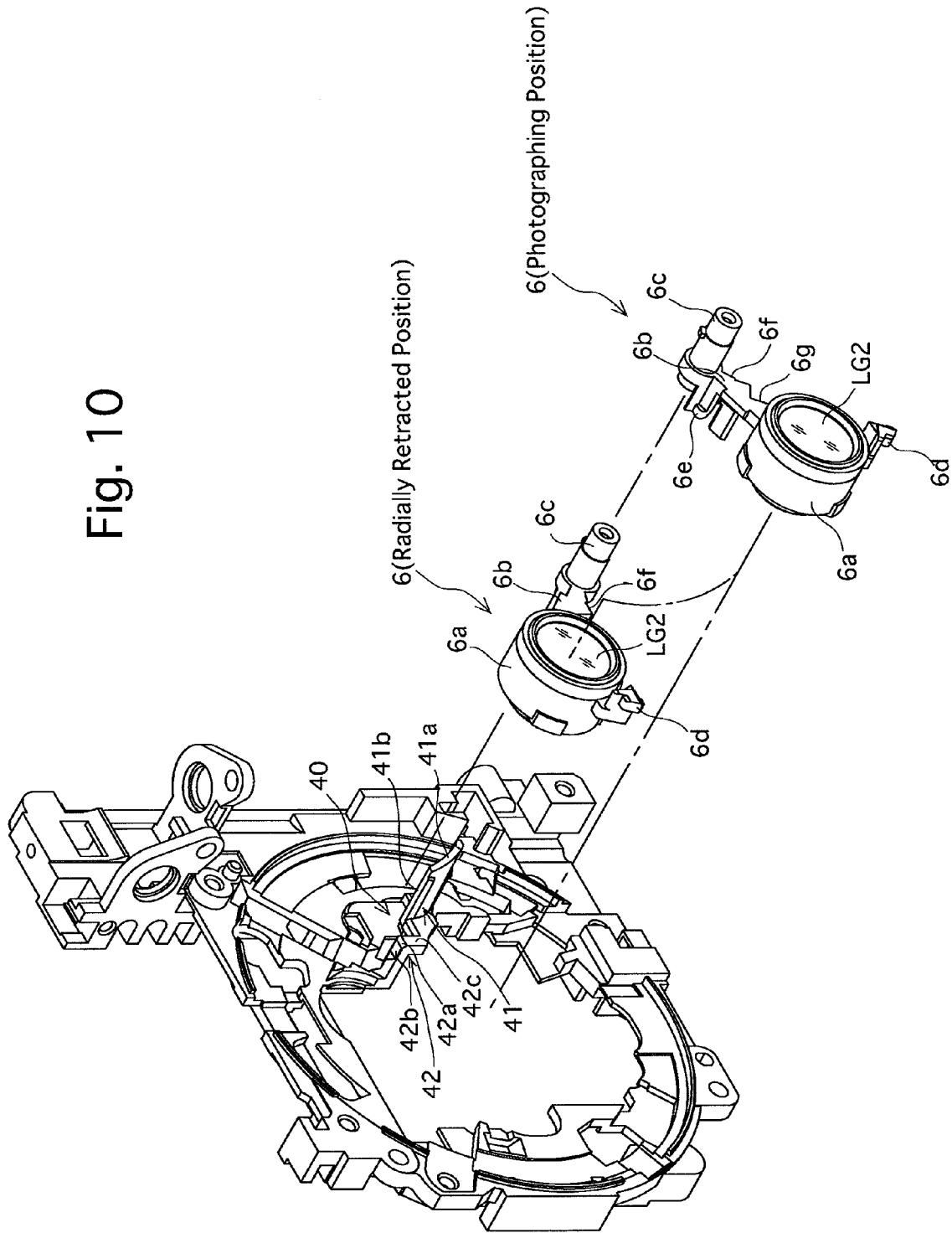
FIG. 10 is a perspective view of the stationary holder and a second lens frame, showing the photographing position and the radially-retracted position of the second lens frame relative to the second lens frame.

In the above described structure, when the zoom lens 201 is fully retracted to the fully-retracted state shown in FIG. 1 from the ready-to-photograph state shown in FIG. 2, the second lens frame 6 remains held in the photographing position until midpoint in the zoom lens retracting operation before the completion of the full retraction of the zoom lens 201. Two second lens frames 6 which are mutually different in angular position are shown in FIG. 10 for the purpose of illustration. In FIG. 10, the right second lens frame 6 represents the photographing position thereof and the left second lens frame 6 represents the radially-retracted position thereof. Upon the second lens frame 6 moving rearward with the second lens frame moving frame 8 to a predetermined position in the optical axis direction, the lead surface 6h of the rear projecting portion 6e comes into contact with the lens-retracting/guiding surface 41a of the first engaging portion 41. The lens-retracting/guiding surface 41a is shaped to give the second lens frame 6 a component force in a direction toward the radially-retracted position thereof by a rearward moving force of the second lens frame 6. Therefore, if the second lens frame 6 moves rearward with the lead surface 6h being in contact with the lens-retracting/guiding surface 41a, the second lens frame 6 rotates about the pivot shaft 33 in a direction toward the radially-retracted position (clockwise as viewed in FIGS. 12 and 13) against the biasing force of the torsion spring 39. At this time, since the lens-retracting/guiding surface 41a is provided at a position (away from the axis of the pivot shaft 33 by a radial distance R1 (radius of the circle CC1); see FIG. 13) in the vicinity of the pivot shaft 33 in a radial direction thereof, the amount of retractive rotation of the second lens group 6 per unit of movement (retractive movement) of the second lens group moving frame 8 in the optical axis direction is great. In other words, the second lens group 6 can be rotated largely in a direction toward the radially-retracted position via a small amount of movement of the second lens group moving frame 8 in the optical axis direction.

Upon the second lens frame 6 further moving rearward after the rear projecting portion 6e has reached the boundary between the lens-retracting/guiding surface 41a and the optical-axis-direction flat surface 41b, the first retracted-state holding surface 6f moves onto the optical-axis-direction flat surface 41b. Thereupon, the retractive rotation of the second lens frame 6 by the lens-retracting/guiding surface 41a is completed. A further retractive movement of the second lens frame 6 causes the first retracted-state holding surface 6f to slide on the optical-axis-direction flat surface 41b rearward. Since each of the first retracted-state holding surface 6f and the optical-axis-direction flat surface 41b is a flat surface parallel to the photographing optical axis Z1, the second lens frame 6 moves rearward with the angle thereof being maintained constant.

A further rearward movement of the second lens group 6 causes the contacting edge 6i of the radial arm portion 6b to come into contact with the lens-retracting/guiding surface 42a of the second engaging portion 42. Similar to the lens-retracting/guiding surface 41a, the lens-retracting/guiding surface 42a is shaped to give the second lens frame 6 a component force in a direction toward the radially-retracted position thereof by a rearward moving force of the second lens frame 6, and the second lens frame 6 rotates while being guided by the lens-retracting/guiding surface 42a to a position where the second retracted-state holding surface 6g moves onto the optical-axis-direction flat surface 42b. At this time, the lens-retracting/guiding surface 42a is provided at a position (away from the axis of the pivot shaft 33 by a radial distance R2 (radius of the circle CC2); see FIG. 13) farther from the pivot shaft 33 than the lens-retracting/guiding surface 41*a*. Accordingly, the amount of retractive rotation of the second lens group 6 per unit of movement (retractive movement) of the second lens group moving frame 8 in the optical axis direction, which is given to the second lens frame 6 by the lens-retracting/guiding surface 42*a*, is smaller than that given to the second lens frame 6 by the lens-retracting/guiding surface 41*a*. The left second lens frame 6 shown in FIG. 10 shows the angular position of the second lens frame 6 having been rotated to the radially-retracted position.

Figure 11:
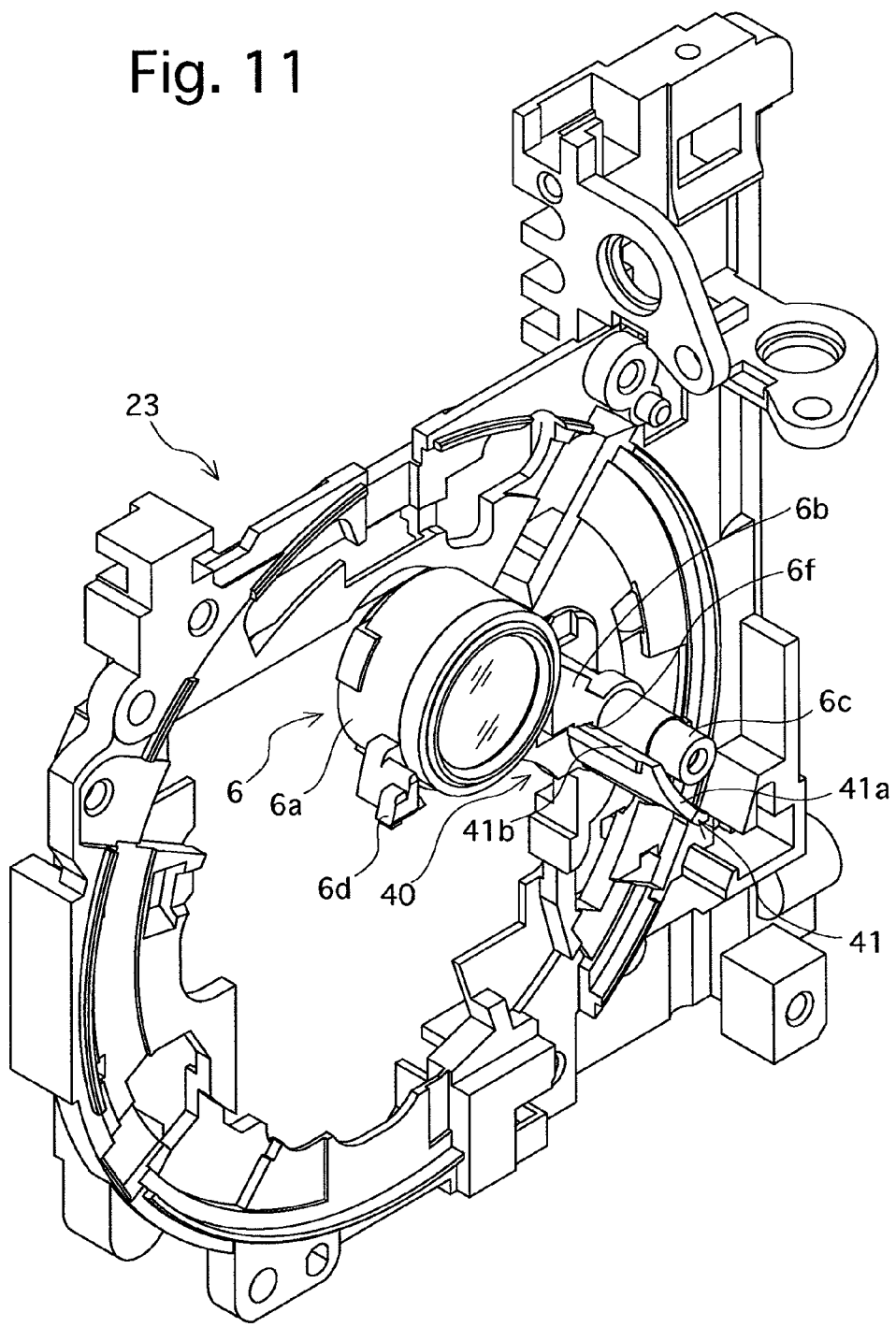
FIG. 11 is a perspective view of the stationary holder and the second lens frame in a state where the second lens frame is retracted to the radially-retracted position, showing the positional relationship among the second lens frame, the stationary holder and the lens-retracting/guiding projection.

Upon the zoom lens 201 reaching the fully-retracted state shown in FIG. 3, the second retracted-state holding surface 6*g* is engaged with the optical-axis-direction flat surface 42*b*. This engagement of the second retracted-state holding surface 6*g* with the optical-axis-direction flat surface 42*b* prevents the second lens frame 6 from rotating in a direction toward the photographing position so that the second lens frame 6 is held in the radially-retracted position (away from the photographing optical axis Z1) against the biasing force of the torsion spring 39. Accordingly, the optical-axis-direction flat surface 42*b* and the second retracted-state holding surface 6*g* constitute a position determining portion for determining the limit of rotation of the second lens frame 6 at the radially-retracted position. FIG. 11 shows a state where the second lens frame 6 is held in the radially-retracted position by the engagement of the optical-axis-direction flat surface 42*b* with the second retracted-state holding surface 6*g*.

As can be understood from the above description, in the above illustrated embodiment of the zoom lens 201, the retracting operation of the second lens frame 6 is roughly divided into two stages. In the first stage, the second lens frame 6 is moved toward the radially-retracted position by the first engaging portion 41. As noted above, the amount of retractive rotation of the second lens group 6 per unit of retractive movement of the second lens group moving frame 8 in the optical axis direction is great when the second lens frame 6 is rotated in a direction toward the radially-retracted position by the lens-retracting/guiding surface 41*a* of the first engaging portion 41. Therefore, the second lens frame 6 can be efficiently retracted from the photographing optical axis Z1 via a short stroke of the second lens group moving frame 8 in the optical axis direction. In the first stage, the second lens frame 6 is moved nearly to the radially-retracted position.

In the subsequent second stage, the final position of the second lens frame 6 is controlled by the second engaging portion 42 of the lens-retracting/guiding projection 40 to move the second lens frame 6 to the radially-retracted position. As noted above, when the second lens frame 6 is rotated to the radially-retracted position by the lens-retracting/guiding surface 42*a* of the second engaging portion 42, the amount of retractive rotation of the second lens group 6 per unit of movement of the second lens group moving frame 8 in the optical axis direction is small. Therefore, in the stage where the retracting movement of the second lens frame 6 is controlled by the second engaging portion 42, the second lens frame 6 is moved more precisely than when the second lens frame 6 is moved by the lens-retracting/guiding surface 41*a* of the first engaging portion 41. As a result, the second lens frame 6 can be moved to the radially-retracted position with a high degree of precision to thereby reduce variations in the radially-retracted position of the second lens frame 6 in which can occur during the manufacture of the digital camera 200. Additionally, in the stage where the retracting movement of the second lens frame 6 is controlled by the second engaging portion 42, there is little possibility of the second lens frame 6 overrunning the radially-retracted position due to momentum of the retractive rotation of the second lens frame 6 since the rotation speed of the second lens frame 6 in a direction toward the radially-retracted position is reduced.

Although the accommodation space in the second lens group moving frame 8 for accommodating the second lens frame 6 retracted to the radially-retracted position is formed to allow for positional error of the second lens frame 6 when the second lens frame 6 is rotated to the radially-retracted position, the second lens frame 6 can be driven to the radially-retracted position with a high degree of precision by the above illustrated embodiment of the two-stage driving mechanism for retracting the second lens group LG2 from the photographing optical axis Z1 in two stages. Consequently, the zoom lens 201 can be miniaturized by reducing the aforementioned accommodation space in the second lens group moving frame 8.

Although the present invention has been described based on the above illustrated embodiment, the present invention is not limited solely to this particular embodiment. For instance, in the illustrated embodiment, the amount of retractive rotation (the angle of retractive rotation) of the second lens group 6 by the lens-retracting/guiding surface 41*a* of the first engaging portion 41 per unit of movement of the second lens group moving frame 8 in the optical axis direction and the amount of retractive rotation (the angle of retractive rotation) of the second lens group 6 by the lens-retracting/guiding surface 42*a* of the second engaging portion 41 per unit of movement of the second lens group moving frame 8 in the optical axis direction can be made different from each other by making the aforementioned radial distance R1 and R2 (distances from the axis of the pivot shaft 33 to the lens-retracting/guiding surfaces 41*a* of the first engaging portion 41 and the lens-retracting/guiding surfaces 42*a* of the second engaging portion 42, respectively) different from each other.

Figure 16:
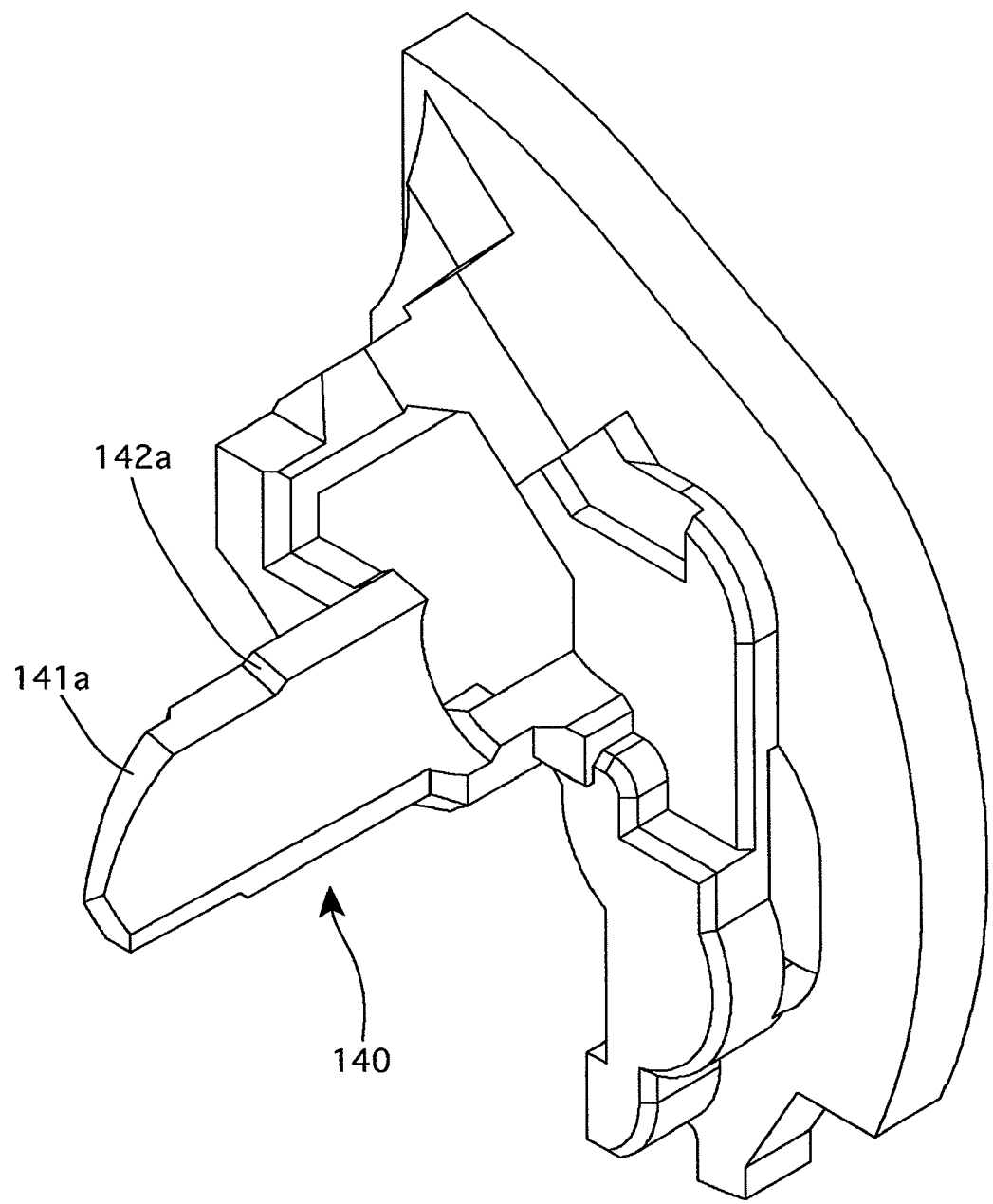
FIG. 16 is an enlarged perspective view of another embodiment of the lens-retracting/guiding projection that is formed integral with the stationary holder and projects forward therefrom.

However, it is possible for two lens-retracting/guiding surfaces corresponding to the lens-retracting/guiding surfaces 41*a* and 42*a* of the above illustrated embodiment to be formed mutually different in lead angle (angle of inclination). FIG. 16 shows another embodiment of a lens-retracting/guiding projection 140 which includes a lens-retracting/guiding surface 141*a* (first engaging portion) and a lens-retracting/guiding surface 142*a* which are mutually different in lead angle (angle of inclination) relative to the photographing optical axis Z1 (not shown in FIG. 16). In this embodiment, the radial distance from the axis of the pivot shaft 33 (not shown in FIG. 16) to the lens-retracting/guiding surfaces 141*a* and the radial distance from the axis of the pivot shaft 33 to the lens-retracting/guiding surfaces 142*a* are mutually identical. The lens-retracting/guiding surfaces 141*a* and 142*a* of the embodiment shown in FIG. 16 can achieve an equivalent effect to that of the lens-retracting/guiding surfaces 41*a* and 42*a* of the embodiment shown in FIG. 9.

Although the above illustrated embodiment of the retractable photographic lens is of a type which moves the second lens frame 6 between the photographing position and the radially-retracted position by rotating the second lens frame 6, the present invention can also be applied to another type of retractable photographic lens which moves a lens frame (corresponding to the second lens frame 6) to the radially-retracted position thereof by moving the lens frame in a straight radial direction of the retractable photographic lens. In this case, the lens-retracting/guiding surface 41*a* and the lens-retracting/guiding surface 42*a* only need to be made mutually different in lead angle relative to the photographing optical axis Z1 as noted above. Namely, if the first lens-retracting/guiding surface for first retracting the second lens frame 6 when the zoom lens 201 is fully retracted is formed so that the lead angle of the first lens-retracting/guiding surface relative to the photographing optical axis is steep (i.e., made to lie in a plane nearly orthogonal to the photographing optical axis) and the second lens-retracting/guiding surface for subsequently retracting the second lens frame 6 when the zoom lens 201 is fully retracted is made so that the lead angle of the second lens-retracting/guiding surface relative to the photographing optical axis is gentle (i.e., made to lie in a plane nearly parallel to the photographing optical axis), an effect similar to that obtained in the case of the lens-retracting/guiding surface 41a and the lens-retracting/guiding surface 42a can be obtained even in the case of the aforementioned other type of retractable photographic lens, in which the lens frame (corresponding to the second lens frame 6) is moved to the radially-retracted position by being moved in a straight radial direction of the retractable photographic lens.

Although the lens-retracting/guiding projection (lens-element-retracting driving device) 40 is formed on the stationary holder 23 that is a stationary member installed at the rearmost end of the photographing optical system of the zoom lens 201 in the above illustrated embodiment, the present invention is not limited solely to the particular position at which the lens-element-retracting driving device is installed. Only the lens-element-retracting driving device needs to be installed between the retractable-optical-element holding frame (which corresponds to the second lens frame 6 in the above illustrated embodiment) and a rear-mounted member installed behind the retractable-optical-element holding frame, wherein the retractable-optical-element holding frame moves in the optical axis direction relative to the rear-mounted member when the zoom lens 201 is fully retracted.

Additionally, the lens-element-retracting driving device is not limited solely to that of the above illustrated embodiment. For instance, in the above illustrated embodiment, the first engaging portion 41 and the second engaging portion 42 that serve as the first lens-element-retracting driving device and the second lens-element-retracting driving device, respectively, are formed on a single member on the stationary holder 23, i.e., on the lens-retracting/guiding projection 40. This configuration makes it possible to attain advantages such as achieving a structure which is simple and superior in strength. However, it is possible for the first lens-element-retracting driving device and the second lens-element-retracting driving device, that respectively correspond to the first engaging portion 41 and the second engaging portion 42, to be formed on different members.

Additionally, it is possible for two lens-retracting/guiding surfaces which correspond to the lens-retracting/guiding surfaces 41a and 42a that are formed on the lens-retracting/guiding projection 40 to be provided only on the retractable-optical-element holding frame (the second lens frame 6).

Additionally, although the above illustrated embodiment of the zoom lens 201 is provided with two lens-element-retracting driving devices (the first engaging portion 41 and the second engaging portion 42) to make the aforementioned two amounts of retractive rotations of the second lens group 6 by the lens-retracting/guiding surfaces 41a and 42a, respectively, per unit of movement of the second lens group moving frame 8 in the optical axis direction different from each other in two stages, it is possible that the retractable photographic lens be provided with more than two lens-element-retracting driving devices for retracting the second lens frame 6 to the radially-retracted position from the photographing optical axis Z1 in more than two stages by different amounts of retractive rotations of the second lens group 6 per unit of movement of the second lens group moving frame 8 in the optical axis direction.

Obvious changes may be made in the specific embodiments of the present invention described herein, such modifications being within the spirit and scope of the invention claimed. It is indicated that all matter contained herein is illustrative and does not limit the scope of the present invention.

What is claimed:

1. A retractable photographic lens comprising:
   an optical-axis-direction moving ring which moves rearward along an optical axis of a photographing optical system when said retractable photographic lens moves from an operating state to a fully-retracted state;
   a retractable-optical-element holding frame which holds a retractable optical element of said photographing optical system, said retractable-optical-element holding frame being positioned inside said optical-axis-direction moving ring and supported thereby to be movable between a photographing position at which said retractable optical element is aligned with said optical axis and a displaced position at which said retractable optical element is displaced from said photographing position; and
   a lens-element-retracting driving device which moves said retractable-optical-element holding frame from said photographing position to said displaced position using a rearward moving force of said optical-axis-direction moving ring when said retractable photographic lens moves from said operating state to said fully-retracted state,
   wherein said lens-element-retracting driving device includes a first lens-element-retracting driving device which gives said retractable-optical-element holding frame a first amount of retractive movement per unit of movement of said optical-axis-direction moving ring, and a second lens-element-retracting driving device which gives said retractable-optical-element holding frame a second amount of retractive movement per unit of movement of said optical-axis-direction moving ring, said second amount of retractive movement being smaller than said first amount of retractive movement, and
   wherein, when said retractable photographic lens moves from said operating state to said fully-retracted state, said first lens-element-retracting driving device firstly moves said retractable-optical-element holding frame toward said displaced position and subsequently said second lens-element-retracting driving device moves said retractable-optical-element holding frame to said displaced position.

2. The retractable photographic lens according to claim 1, further comprising:
   a rear-mounted member positioned behind said optical-axis-direction moving ring and said retractable-optical-element holding frame, a distance between said rear-mounted member and said optical-axis-direction moving ring in said optical axis direction becoming smaller as said retractable photographic lens moves from said operating state to said fully-retracted state,
   wherein said first lens-element-retracting driving device and said second lens-element-retracting driving device include a first rear-mounted engaging portion and a second rear-mounted engaging portion, respectively, which are provided on said rear-mounted member at different positions both in a direction parallel to said optical axis and in a direction orthogonal to said optical axis; and a first engaging portion and a second engaging portion, respectively, which are provided on said retractable-optical-element holding frame and come into contact with said first rear-mounted engaging portion and said second rear-mounted engaging portion, respectively, with a time difference therebetween when said optical-axis-direction moving ring moves rearward.

3. The retractable photographic lens according to claim 2, wherein said first rear-mounted engaging portion and said second rear-mounted engaging portion are formed on a projection which projects forward from said rear-mounted member in said optical axis direction.

4. The retractable photographic lens according to claim 2, wherein each of said first rear-mounted engaging portion and said second rear-mounted engaging portion comprises:
   a lens-retracting/guiding surface which is inclined to said optical axis, and gives said retractable-optical-element holding frame a moving force which moves said retractable-optical-element holding frame in a direction from said photographing position to said displaced position in accordance with a rearward movement of said optical-axis-direction moving ring; and
   a holding surface which is formed behind said lens-retracting/guiding surface in said optical axis direction to be continuous with said lens-retracting/guiding surface, said holding surface extending parallel to said optical axis, and preventing said retractable-optical-element holding frame from moving toward said photographing position from said displaced position via engagement with said retractable-optical-element holding frame.

5. The retractable photographic lens according to claim 4, wherein an angle of said lens-retracting/guiding surface of said first rear-mounted engaging portion relative to said optical axis is greater than an angle of said lens-retracting/guiding surface of said second rear-mounted engaging portion relative to said optical axis.

6. The retractable photographic lens according to claim 2, wherein said rear-mounted member is immovable in said optical axis direction.

7. The retractable photographic lens according to claim 1, wherein said retractable-optical-element holding frame is pivoted about a pivot on said optical-axis-direction moving ring to be swingable between said photographing position and said displaced position.

8. The retractable photographic lens according to claim 7, wherein said pivot extends substantially parallel to said optical axis.

9. The retractable photographic lens according to claim 7, wherein a radial distance from said first lens-element-retracting driving device to said pivot of said retractable-optical-element holding frame is different from a radial distance from said second lens-element-retracting driving device to said pivot of said retractable-optical-element holding frame.

10. The retractable photographic lens according to claim 7, wherein said first lens-element-retracting driving device and said second lens-element-retracting driving device comprises a first lens-retracting/guiding surface and a second lens-retracting/guiding surface which are inclined to said optical axis by mutually different angles, wherein the radial distance from said pivot to said first lens-retracting/guiding surface and the radial distance from said pivot to and second lens-retracting/guiding surface are mutually identical.

11. The retractable photographic lens according to claim 4, wherein said retractable-optical-element holding frame comprises:
   a cylindrical lens holder portion configured to hold said retractable optical element;
   a swing arm portion projecting from said cylindrical lens holder portion in a radial direction of said cylindrical lens holder portion; and
   a pivoted cylindrical portion located at an end of said swing arm portion and fitted on a pivot which extends substantially parallel to said optical axis and which is positioned inside said retractable-optical-element holding frame,
   wherein said swing arm portion includes a first retracted state holding surface and a second retracted state holding surface which are located in that order from said pivoted cylindrical portion side, and are engaged with said holding surface of said first rear-mounted engaging portion and said holding surface of said second rear-mounted engaging portion, respectively, to hold said retractable-optical-element holding frame in said displaced position when said retractable photographic lens moves from said operating state to said fully-retracted state.

12. The retractable photographic lens according to claim 1, wherein said retractable-optical-element holding frame is positioned inside said optical-axis-direction moving ring and supported thereby to be movable in a straight radial direction between said photographing position and said displaced position.

13. The retractable photographic lens according to claim 1, wherein said retractable-optical-element holding frame is movable in a plane substantially orthogonal to said optical axis between said photographing position and said displaced position relative to said optical-axis-direction moving ring.

14. The retractable photographic lens according to claim 1, wherein said retractable-optical-element holding frame is biased toward said photographing position by a spring, said first and second lens-element-retracting driving devices moving said retractable-optical-element holding frame from said photographing position to said displaced position against a biasing force of said spring.

15. The retractable photographic lens according to claim 2, wherein said optical-axis-direction moving ring is guided linearly along said optical axis without rotating relative to said rear-mounted member.

16. The retractable photographic lens according to claim 1, wherein said photographing optical system comprises a zoom lens system, said retractable optical element serving as a part of said zoom lens system.

17. A retractable photographic lens comprising:
   an optical-axis-direction moving ring which moves rearward along an optical axis of a photographing optical system when said retractable photographic lens moves from an operating state to a fully-retracted state;
   a retractable-optical-element holding frame which holds a retractable optical element of said photographing optical system and is positioned inside said optical-axis-direction moving ring and pivoted about a pivot thereon to be swingable between a photographing position at which said retractable optical element is aligned with said optical axis and a displaced position at which said retractable optical element is displaced from said photographing position; and
   a rotatable lens-element-retracting device which rotates said retractable-optical-element holding frame from said photographing position to said displaced position using a rearward moving force of said optical-axis-direction moving ring when said retractable photographic lens moves from said operating state to said fully-retracted state,
   wherein said rotatable lens-element-retracting device includes a first lens-element-retracting rotating device which gives said retractable-optical-element holding frame a first amount of retractive rotation per unit of movement of said optical-axis-direction moving ring in said optical axis direction; and a second lens-element-retracting rotating device which gives said retractable-optical-element holding frame a second amount of retractive rotation per unit of movement of said optical-axis-direction moving ring in said optical axis direction, said second amount of retractive rotation being smaller than said first amount of retractive rotation, wherein a radial distance from said first lens-element-retracting rotating device to said pivot of said retractable-optical-element holding frame is different from a radial distance from said second lens-element-retracting rotating device to said pivot of said retractable-optical-element holding frame, and wherein, when said retractable photographic lens moves from said operating state to said fully-retracted state, said first lens-element-retracting rotating device firstly rotates said retractable-optical-element holding frame toward said displaced position and subsequently said second lens-element-retracting rotating device rotates said retractable-optical-element holding frame to said displaced position.

* * * * *